United States Patent
Lee

(10) Patent No.: US 11,866,526 B2
(45) Date of Patent: Jan. 9, 2024

(54) LIQUID, HYBRID UV/VIS RADIATION CURABLE RESIN COMPOSITIONS FOR ADDITIVE FABRICATION

(71) Applicant: Covestro (Netherlands) B.V., Geleen (NL)

(72) Inventor: Tai Yeon Lee, Elgin, IL (US)

(73) Assignee: STRATASYS, INC., Eden Prairie, MN (US)

( * ) Notice: Subject to any disclaimer, the term of this patent is extended or adjusted under 35 U.S.C. 154(b) by 0 days.

(21) Appl. No.: 17/637,161

(22) PCT Filed: Aug. 31, 2020

(86) PCT No.: PCT/US2020/048672
§ 371 (c)(1),
(2) Date: Feb. 22, 2022

(87) PCT Pub. No.: WO2021/042013
PCT Pub. Date: Mar. 4, 2021

(65) Prior Publication Data
US 2022/0282003 A1  Sep. 8, 2022

Related U.S. Application Data

(60) Provisional application No. 62/893,969, filed on Aug. 30, 2019.

(51) Int. Cl.
| | |
|---|---|
| C08F 2/46 | (2006.01) |
| C08F 2/50 | (2006.01) |
| C08G 61/04 | (2006.01) |
| B29C 64/129 | (2017.01) |
| C08F 222/10 | (2006.01) |
| C08G 59/24 | (2006.01) |
| C08K 5/03 | (2006.01) |
| C08K 5/55 | (2006.01) |
| B33Y 10/00 | (2015.01) |
| B33Y 70/00 | (2020.01) |
| B33Y 80/00 | (2015.01) |

(52) U.S. Cl.
CPC .............. *C08F 2/50* (2013.01); *B29C 64/129* (2017.08); *C08F 222/102* (2020.02); *C08G 59/24* (2013.01); *C08K 5/03* (2013.01); *C08K 5/55* (2013.01); *B33Y 10/00* (2014.12); *B33Y 70/00* (2014.12); *B33Y 80/00* (2014.12); *C08K 2201/019* (2013.01)

(58) Field of Classification Search
CPC ...... C08G 59/24; C08G 59/68; C08G 65/105; C08K 5/03; C08K 5/55; C08K 2201/019; B33Y 10/00; B33Y 70/00; B33Y 80/00; B29C 64/129; C08F 222/102; C08F 2/50
USPC ................. 522/66, 5, 189, 184, 71, 1; 520/1
See application file for complete search history.

(56) References Cited

U.S. PATENT DOCUMENTS

| | | |
|---|---|---|
| 4,324,744 A | 4/1982 | Lechtken et al. |
| 4,575,330 A | 3/1986 | Hull |
| 4,737,593 A | 4/1988 | Ellrich et al. |
| 5,047,568 A | 9/1991 | Angelo et al. |
| 5,380,923 A | 1/1995 | Wright et al. |
| 5,418,112 A | 5/1995 | Mirle et al. |
| 5,434,196 A | 7/1995 | Ohkawa et al. |
| 5,534,559 A | 7/1996 | Leppard et al. |
| 5,665,792 A | 9/1997 | Lawton et al. |
| 5,942,290 A | 8/1999 | Leppard et al. |
| 6,020,528 A | 2/2000 | Leppard et al. |
| 6,368,769 B1 | 4/2002 | Ohkawa et al. |
| 6,486,226 B2 | 11/2002 | Al-Akhdar et al. |
| 6,486,228 B2 | 11/2002 | Kohler et al. |
| 7,230,122 B2 | 6/2007 | Liu et al. |
| 7,611,817 B2 | 11/2009 | Nakayashiki et al. |
| 7,678,528 B2 | 3/2010 | Rahman et al. |
| 8,216,768 B2 | 7/2012 | Yamamoto et al. |
| 8,617,787 B2 | 12/2013 | Suzuki et al. |
| 9,005,871 B2 | 4/2015 | Yamato et al. |
| 9,708,442 B1 | 7/2017 | Kwisnek et al. |
| 10,604,659 B2 | 3/2020 | Lee et al. |
| 2008/0280229 A1 | 11/2008 | Tao et al. |
| 2009/0093564 A1 | 4/2009 | Oyanagi et al. |
| 2009/0182172 A1 | 7/2009 | Kolb et al. |
| 2011/0039205 A1 | 2/2011 | Suzuki et al. |
| 2012/0251841 A1 | 10/2012 | Southwell et al. |
| 2017/0355857 A1 | 12/2017 | Lee et al. |
| 2022/0155679 A1* | 5/2022 | Aizu ..................... B41C 1/1008 |

FOREIGN PATENT DOCUMENTS

| | | | |
|---|---|---|---|
| WO | 03076544 A1 | 9/2003 | |
| WO | 2011075555 A1 | 6/2011 | |
| WO | 2012177122 A1 | 12/2012 | |
| WO | WO-2012177122 A1 * | 12/2012 | ............. C08G 59/68 |
| WO | WO-2014156742 A1 * | 10/2014 | ............. C08G 59/24 |

OTHER PUBLICATIONS

Atasu et al, WO 2014156742 Machine Translation, Oct. 2, 2014 (Year: 2014).*
International Search Report, PCT/US2020/048672, dated Oct. 15, 2020, Authorized officer: Timothy O'Sullivan.
Parikh, A., Parikh, H., & Parikh, K. (2006). Norrish Type I and II Reaction (Cleavage). In Name Reactions in Organic Synthesis (pp. 325-329). Foundation Books.

(Continued)

*Primary Examiner* — Jessica Whiteley
(74) *Attorney, Agent, or Firm* — Faegre Drinker Biddle & Reath LLP

(57) ABSTRACT

Liquid radiation curable compositions are disclosed which are suitable for hybrid (i.e. cationic and free-radical) polymerization when processed via additive fabrication equipment utilizing sources of actinic radiation with peak spectral intensities in the UV/vis region. According to one aspect, the compositions possess a first photoinitiator that is an iodonium salt of a non-fluorinated borate anion. According to another aspect, the composition is substantially devoid of a Norrish Type I and/or Type II photoinitiator. Also disclosed are methods of creating three-dimensional parts via additive fabrication processes utilizing sources of actinic radiation with peak spectral intensities in the UV/vis region employing liquid radiation curable compositions suitable for hybrid polymerization, and the parts cured therefrom.

20 Claims, No Drawings

(56) References Cited

OTHER PUBLICATIONS

Yamamura, Tetsuya et al, Photosensitization of Carbazole Derivatives and Application to Photofabrication in Cationic System, J Photopolymer Science & Tech (2000), 13(1), 117-118.
Crivello, James V., J Poly Science, Part A (2008), 46(11), 3820-29.
G. Odian, Principles of Polymerization, 3rd Ed., 1991, p. 222.

* cited by examiner

LIQUID, HYBRID UV/VIS RADIATION CURABLE RESIN COMPOSITIONS FOR ADDITIVE FABRICATION

CROSS-REFERENCE TO RELATED APPLICATIONS

This application is a national stage application under 35 U.S.C. § 371 of PCT/EP2020/048672, filed Aug. 31, 2020, which claims to the benefit of U.S. provisional patent application No. 62/893,969, which was filed on 30 Aug. 2019, each of which is hereby incorporated by reference in its entirety as if fully set forth herein.

TECHNICAL FIELD

The present invention relates to liquid compositions for additive fabrication processes that are hybrid-curable in the UV or visible spectra.

BACKGROUND

Additive fabrication processes for producing three dimensional objects are well known. Additive fabrication processes utilize computer-aided design (CAD) data of an object to build three-dimensional parts. These three-dimensional parts may be formed from liquid resins, powders, or other materials.

A well-known, non-limiting example of an additive fabrication process is stereolithography (SL). Stereolithography is a process for rapidly producing models, prototypes, patterns, and production parts in certain applications. SL uses CAD data of an object wherein the data is transformed into thin cross-sections of a three-dimensional object. The data is loaded into a computer which controls a laser that traces a pattern of a cross section through a liquid radiation curable resin composition contained in a vat, solidifying a thin layer of the resin corresponding to the cross section. The solidified layer is recoated with resin and the laser traces another cross section to harden another layer of resin on top of the previous layer. The process is repeated layer by layer until the three-dimensional object is completed. When initially formed, the three-dimensional object is, in general, not fully cured, and is called a "green model." Although not required, the green model may be subjected to post-curing to enhance the mechanical properties of the finished part. An example of an SL process is described in, for example, U.S. Pat. No. 4,575,330.

Lasers have traditionally served as the radiation source of choice in additive fabrication processes such as stereolithography. The use of gas lasers to cure liquid radiation curable resin compositions is well known. The delivery of laser energy in a stereolithography system can be Continuous Wave (CW) or Q-switched pulses. CW lasers provide continuous laser energy and can be used in a high speed scanning process. Historically, several types of lasers have been used in stereolithography, with peak spectral outputs ranging traditionally from 193 nm to 355 nm in wavelength, although other wavelength variants exist. The light emitted from lasers is monochromatic, that is, a high percentage of the total spectral output occurs within a very narrow wavelength range. Amongst laser-based additive manufacturing systems in the industry, those operating at a peak spectral output of 355 nm have become most prevalent.

Laser-based systems, particularly those operating at a peak spectral output of at or near 355 nm, are not without their drawbacks, however. The significant power output of such laser-based systems sometimes generates excessive heat at the point of irradiation which may be detrimental to the resin. Further, the use of a laser at any wavelength requires scanning point-by-point on the resin surface, a process which can be particularly time-consuming when the cross-sectional pattern to be cured is large or complex. Also, 355 nm laser-based systems are expensive and are associated with high maintenance costs and energy consumption.

To combat some of the drawbacks associated with laser-based systems, other additive fabrication systems have begun to utilize image projection technology as the source of actinic radiation. One example of this is Liquid Crystal Display (LCD), a technology that is well-known in other industries such as the manufacture of television sets and computer monitors. Another non-limiting example was developed by Texas Instruments called Digital Light Processing (DLP®). DLP systems selectively transfer light from an input source and project that light in a desired output pattern or mask using pixel-representative microscopic mirrors that are controlled by and affixed to a microchip known as a Digital Micromirror Device (DMD). DLP technology was developed to be used in image projection systems as an alternative display system to LCD-based technology. The exceptional image sharpness, brightness, and uniformity associated with DLP systems lends it well to additive fabrication wherein image resolution and precision is critical, as the boundaries of the light projected ultimately define that of the three-dimensional object to be cured and created. Furthermore, image projection systems such as LCD and DLP provide a theoretical speed advantage in that they enable an entire cross-sectional layer to be exposed and cured simultaneously. Furthermore, wherein the required cure time in laser-based systems is directly proportional to the complexity of the cross-section to be scanned, image projection systems are said to be cross-section independent, meaning the exposure time of a given layer does not change with increasing shape complexity of any given layer. This makes them particularly well-suited for parts created via additive fabrication with complex and detailed geometries.

DLP and LCD are not alternative methods of producing light itself; rather they provide a way of processing the light emanating from existing light sources into a more desirable pattern. Thus, coupled input light sources are also still needed. Although the light input to an image projection system may be from any source, including traditional lamps or even lasers, more commonly the input light is collimated from one or more light emitting diodes (LEDs).

LEDs are semiconductor devices which utilize the phenomenon of electroluminescence to generate light. At present, LED light sources for additive fabrication systems currently emit light at wavelengths between 300 and 475 nm, with 365 nm, 375 nm, 395 nm, 401 nm, 405 nm, and 420 nm being common peak spectral outputs. See textbook, "Light-Emitting Diodes" by E. Fred Schubert, $2^{nd}$ Edition, © E. Fred Schubert 2006, published by Cambridge University Press, for a more in-depth discussion of LED light sources. LEDs provide the advantage that they theoretically operate at close to peak efficiency for a longer duration than other light sources. Furthermore, they are typically more energy efficient and inexpensive to maintain, resulting in a lower initial and ongoing cost of ownership than versus laser-based optics systems.

Therefore, various additive fabrication systems have employed one of the following non-limiting examples of optics configurations: (1) laser only, (2) laser/DLP, (3) LED only, (4) LED/DLP, or (5) LED/LCD. Systems not utilizing DLP technology may also incorporate other collimating or focusing lenses/mirrors to selectively direct the light onto the liquid resin.

Recently, newer additive fabrication systems—regardless of the optics configuration—have begun to more frequently employ light sources that emit radiation at wavelengths greater than the traditional output at 355 nm. Others have shifted away from monochromatic light sources, opting instead for those which emit light possessing a wider spectral output distribution. Thus, such newer systems incorporating laser/DLP-, LED-, LED/DLP-, or LED/LCD-based optics configurations have begun operate at peak spectral outputs of a longer wavelength and with wider spectral distributions than was previously common. The wavelengths employed therein have shifted away from 355 nm towards the direction of the visible spectrum, with some even possessing a peak spectral output into the visible range. Such longer wavelengths (i.e. from 375 nm to 500 nm) are heretofore referred to as "UV/vis".

Some non-limiting reasons commonly cited for the current trend towards the increasing use of optics in the UV/vis region are: (1) the reduced cost (both initial and maintenance costs) of light sources that operate in the UV/vis range, as well as (2) the fact that UV/vis light sources emit radiation at lower energies than light sources emitting deeper into the UV region, and, all else being equal, are less damaging to human tissue. This makes them less harmful upon accidental exposure than those operating deeper into the UV region. As the popularity of additive manufacturing continues to grow amongst the consumer, "prosumer", and industrial market segments, the need for additive fabrication systems employing lower-cost, less dangerous sources of actinic radiation with which to cure liquid photopolymers will become increasingly important.

The benefits of the utilization of a UV/vis light source/optics system are not without notable tradeoffs, however. To date, the largest drawback is the relatively increased difficulty with which to develop suitable photopolymers for systems utilizing UV/vis optics. One of the primary reasons for this is that in addition to the natural phenomenon of reduced energy of light at longer wavelengths, the intensity of commercial light sources also typically decreases as the wavelength of the peak spectral output increases. Thus, whereas the traditional 355 nm laser-based lights systems might impart an irradiance of 1500 W/cm$^2$ at the surface of a resin, commercial systems operating at around 400 nm are known to impart an irradiance of roughly only around $\frac{1}{1000}^{th}$ of that value the surface of a resin. In fact, the irradiance at the resin surface imparted by the UV/vis optics on existing 365 nm or 405 nm DLP-based commercial additive fabrication systems can be as low as 0.1 W/cm$^2$ or even 0.0002 W/cm$^2$ for some more economical desktop units. These relatively reduced radiation energies/intensities make it more difficult for photopolymerization reactions to occur in the radiation-curable resins via such UV/vis optics unless exposure times become prohibitively long. This in turn increases part build times significantly, such that the theoretical speed advantage of photomasking display systems is negated. Furthermore, fewer photoinitiating systems—in particular cationic photoinitiating systems—exist on the market for promoting photopolymerization at such longer UV/vis wavelengths.

The aforementioned challenges have resulted in a limited number of photopolymers being made available for the modern optics systems operating in the UV/vis region, relative to the variety of options available for systems operating deeper into the UV region, such as 355 nm laser-based systems.

Radically-polymerizable resins are known to exist for systems employing UV/vis optics. Such resins generally consist of one or more (meth)acrylate compounds (or other free-radical polymerizable organic compounds) along with a free-radical photoinitiator for radical generation. U.S. Pat. No. 5,418,112 describes one such radical-curable system. Although radically-polymerizable resins will readily cure under even the relatively lower energy and lower intensity afforded by UV/vis optics, they are not suitable for all additive fabrication applications. First, (meth)acrylate based resins considered suitable for additive fabrication processes have traditionally produced cured parts with insufficient mechanical properties to be incorporated into many end-use applications. Therefore, they produce parts which are typically not robust enough for non-prototyping applications. Also, such resins typically exhibit problems of deformation, such as production of warped or malformed parts, because of residual strain due to the differential shrinkage during curing. Such problems are exacerbated on larger-platform additive fabrication machines, wherein the cumulative differential shrinkage effect amplifies part warping or malformation as cured objects become larger. These problems of deformation can be partially rectified through software which accounts for known shrinkage rates by modifying the CAD file from which a solid three-dimensional part is generated. However, software corrections are insufficient to completely compensate for deformation in parts which have intricate and complicated shapes, or require a strict dimensional tolerance across long distances.

Another well-known type of resin suitable for use in additive fabrication systems is a "hybrid" curable resin, or one that comprises: (1) epoxies, oxetanes, or other types of cationically polymerizable compounds; (2) one or more cationic photoinitiators; (3) acrylate resins or other types of free radical polymerizable compounds; and (4) one or more free radical photoinitiators. Examples of such hybrid curable systems are described in, for example, U.S. Pat. No. 5,434,196. Such resins have long-been known to result in cured parts produced via additive fabrication processes with superior mechanical properties relative to all-acrylate based resins. Furthermore, hybrid curable systems are superior to all-acrylate systems in that they suffer less from the differential shrinkage problems that have long-plagued all-acrylate systems.

However, because the ring-opening process of cationic polymerization generally occurs more slowly and requires more activation energy than free radical polymerization, it is inherently more difficult to ensure that such formulations for additive fabrication applications adequately cure, or successfully "build" a three dimensional object. And even if curing does at least partially occur after the hybrid-curable resin is subjected to actinic radiation, the green model produced therefrom possesses insufficient mechanical strength (or "green strength") as measured by, for example, modulus of elasticity or fracture strength, to be used in many additive manufacturing applications. Such problems are significantly exacerbated by UV/vis optics that emit radiation at lower energies and intensities than conventional systems.

Because of such limitations, heretofore, few hybrid liquid radiation curable resin for additive fabrication are known which are suitable for use in more modern additive fabrication systems employing UV/vis optics. Some are described in U.S. Pat. Nos. 9,708,442 and 10,604,659, each assigned to DSM IP Assets B.V., but given the wide variance in additive manufacturing systems employing UV/vis optics, further solutions are welcome.

Accordingly, it would be desirable to provide liquid radiation curable resins for additive fabrication—hybrid curable or otherwise—that are suitable for additive fabrication systems employing UV/vis optics and are also simultaneously both (1) sufficiently fast-curing and (2) able to impart sufficient mechanical strength and resistance to shrinkage deformation into the three dimensional parts that they are cured therefrom. It would further or alternatively be desirable to provide hybrid curable, liquid radiation resin compositions that are suitable for use in additive fabrication systems employing UV/vis optics that can produce three-dimensional parts with excellent accuracy and/or mechanical properties at least comparable to existing hybrid-curable materials designed for traditional, laser-based 355 nm systems.

BRIEF SUMMARY

Described herein are several embodiments of the invention. According to a first aspect, the invention involves a radiation curable composition comprising a cationically curable constituent and a free-radically curable constituent, said composition further comprising at least a first photoinitiator that is an iodonium salt of a non-fluorinated borate anion. According to other embodiments of the first aspect, the non-fluorinated borate anion of the iodonium salt has the formula

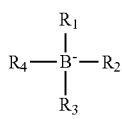

wherein $R_1$-$R_4$ are independently selected from the group consisting of alkyl, alkenyl, alkynyl, cycloalkyl, heterocycloalkyl, aryl, and heteroaryl, and further wherein (i) one or more substitutable carbon atoms of alkyl, alkenyl, or alkynyl is optionally substituted with hydroxy, carboxy, alkoxy, alkanoyl, hydroxyalkyl, carboxyalkyl, alkoxyalkyl, or alkanoylalkyl, or (ii) one or more substitutable carbon atoms of cycloalkyl, heterocycloalkyl, aryl, or heteroaryl is optionally substituted with alkyl, hydroxy, carboxy, alkoxy, alkanoyl, hydroxyalkyl, carboxyalkyl, alkoxyalkyl, or alkanoylalkyl.

According to yet further embodiments, the composition is substantially devoid of certain types of free-radical photoinitiators, such as phosphorous-containing photoinitiators, Norrish Type I photoinitiators, and/or Norrish Type II photoinitiators.

According to still further embodiments, the composition additionally includes a photosensitizer and/or a reductant. Said reductant is preferably an electron-donating substituent bonded to a vinyl group, such as a multifunctional vinyl ether compound containing at least two vinyl groups per molecule.

The second aspect of the claimed invention describes methods of forming a three-dimensional article via an additive fabrication system utilizing UV/vis optics utilizing any of the compositions according to the first aspect.

The third aspect of the claimed invention is the three-dimensional part formed by the second aspect of the invention using the liquid radiation curable composition of the first aspect of the invention.

DETAILED DESCRIPTION

Throughout this document, "UV/vis" is defined as the region of the electromagnetic spectrum from 375 nanometers (nm) to 500 nanometers (nm).

Accordingly, throughout this document "UV/vis optics" is defined as any electrical, mechanical, or electro-mechanical system which generates and directs/displays actinic radiation that operates at a peak spectral intensity of between 375 nm to 500 nm. Specific non-limiting examples of UV/vis optics include lasers, LEDs, one or more LEDs coupled to a DLP display system, one or more LEDs which are coupled to a LCD display system, lasers coupled to a DLP display system, and lasers coupled to a LCD display system.

Furthermore, as used herein, "substantially devoid" is meant to denote that a particular composition or component (as designated by context) possesses virtually no quantity of a particular substance by weight, for example less than 0.1 wt. %, or less than 0.05 wt. %, or preferably less than 0.01 wt %, or about 0.00 wt. % of the particular substance.

A first embodiment of the invention is a radiation curable composition comprising a cationically curable constituent and a free-radically curable constituent, said composition further comprising at least a first photoinitiator that is an iodonium salt of a non-fluorinated borate anion.

Compositions according to the first aspect therefore contain a cationically curable component, a free-radically polymerizable component, and a photoinitiator. In preferred embodiments, said compositions include both a free-radical photoinitiator and a cationic photoinitiator. Said compositions may further include one or more photosensitizers, reductants, and/or additives.

Cationically Curable Component

In accordance with an embodiment, the liquid radiation curable resins for additive fabrication of the invention comprise at least one cationically polymerizable component; that is a component which undergoes polymerization initiated by cations or in the presence of acid generators. The cationically polymerizable components may be monomers, oligomers, and/or polymers, and may contain aliphatic, aromatic, cycloaliphatic, arylaliphatic, heterocyclic moiety(ies), and any combination thereof. Preferably, the cationically polymerizable component includes at least one cycloaliphatic compound. Suitable cyclic ether compounds can comprise cyclic ether groups as side groups or groups that form part of an alicyclic or heterocyclic ring system.

The cationic polymerizable component is selected from the group consisting of cyclic ether compounds, cyclic acetal compounds, cyclic thioethers compounds, spiro-orthoester compounds, cyclic lactone compounds, and any combination thereof.

Suitable cationically polymerizable components include cyclic ether compounds such as epoxy compounds and oxetanes, cyclic lactone compounds, cyclic acetal compounds, cyclic thioether compounds, and spiro-orthoester compounds. Specific examples of cationically polymerizable components include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resins, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexanecarboxylate, 2-(3,4-epoxycyclohexyl-5,5-spiro-3,4-epoxy)-cyclohexane-1,4-dioxane, bis(3,4-epoxycyclohexylmethyl)adipate, vinylcyclohexene oxide, 4-vinylepoxycyclohexane, vinylcyclohexene dioxide, limonene oxide, limonene dioxide, bis(3,4-epoxy-6-methylcyclohexylmethyl)adipate, 3,4-epoxy-6-methylcyclohexyl-3',4'-epoxy-6'-methylcyclohexanecarboxylate, ε-caprolactone-modified 3,4-epoxycyclohexylmethyl-3',4'-epoxycyclohexane carboxylates, trimethylcaprolactone-modified 3,4-epoxycyclohexylmethyl-3',4'-epoxycyclohexane carboxylates, β-methyl-δ-valerolactone-modified 3,4-epoxycyclohexcylmethyl-3',4'-epoxycyclohexane carboxylates, methylenebis(3,4-epoxycyclohexane), bicyclohexyl-3,3'-epoxide, bis(3,4-epoxycyclohexyl) with a linkage of —O—, —S—, —SO—, —SO$_2$—, —C(CH$_3$)$_2$—, —CBr$_2$—, —C(CBr$_3$)$_2$—, —C(CF$_3$)$_2$—, —C(CC$_{13}$)$_2$—, or —CH(C$_6$H$_5$)—, dicyclopentadiene diepoxide, di(3,4-epoxycyclohexylmethyl) ether of ethylene glycol, ethylenebis(3,4-epoxycyclohexanecarboxylate), epoxyhexahydrodioctylphthalate, epoxyhexahydro-di-2-ethylhexyl phthalate, 1,4-butanediol diglycidyl ether, 1,6-hexanediol diglycidyl ether, neopentylglycol diglycidyl ether, glycerol triglycidyl ether, trimethylolpropane triglycidyl ether, polyethylene glycol diglycidyl ether, polypropylene glycol diglycidyl ether, diglycidyl esters of aliphatic long-chain dibasic acids, monoglycidyl ethers of aliphatic higher alcohols, monoglycidyl ethers of phenol, cresol, butyl phenol, or polyether alcohols obtained by the addition of alkylene oxide to these compounds, glycidyl esters of higher fatty acids, epoxidated soybean oil, epoxybutylstearic acid, epoxyoctylstearic acid, epoxidated linseed oil, epoxidated polybutadiene, 1,4-bis[(3-ethyl-3-oxetanylmethoxy)methyl]benzene, 3-ethyl-3-hydroxymethyloxetane, 3-ethyl-3-(3-hydroxypropyl)oxymethyloxetane, 3-ethyl-3-(4-hydroxybutyl)oxymethyloxetane, 3-ethyl-3-(5-hydroxypentyl)oxymethyloxetane, 3-ethyl-3-phenoxymethyloxetane, bis((1-ethyl(3-oxetanyl))methyl)ether, 3-ethyl-3-((2-ethylhexyloxy)methyl)oxetane, 3-ethyl-((triethoxysilylpropoxymethyl)oxetane, 3-(meth)-allyloxymethyl-3-ethyloxetane, 3-hydroxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]-benzene, [1-(3-ethyl-3-oxetanylmethoxy)ethyl]phenyl ether, isobutoxymethyl(3-ethyl-3-oxetanylmethyl)ether, 2-ethylhexyl(3-ethyl-3-oxetanylmethyl)ether, ethyldiethylene glycol(3-ethyl-3-oxetanylmethyl)ether, dicyclopentadiene (3-ethyl-3-oxetanylmethyl)ether, dicyclopentenyloxyethyl (3-ethyl-3-oxetanylmethyl)ether, dicyclopentenyl(3-ethyl-3-oxetanylmethyl)ether, tetrahydrofurfuyl(3-ethyl-3-oxetanylmethyl)ether, 2-hydroxyethyl(3-ethyl-3-oxetanylmethyl) ether, 2-hydroxypropyl(3-ethyl-3-oxetanylmethyl)ether, and any combination thereof.

The cationically polymerizable component may optionally also contain polyfunctional materials including dendritic polymers such as dendrimers, linear dendritic polymers, dendrigraft polymers, hyperbranched polymers, star branched polymers, and hypergraft polymers with epoxy or oxetane functional groups. The dendritic polymers may contain one type of polymerizable functional group or different types of polymerizable functional groups, for example, epoxy and oxetane functions.

In an embodiment, the composition of the present invention also comprises one or more mono or poly glycidylethers of aliphatic alcohols, aliphatic polyols, polyesterpolyols or polyetherpolyols. Examples of preferred components include 1,4-butanedioldiglycidylether, glycidylethers of polyoxyethylene and polyoxypropylene glycols and triols of molecular weights from about 200 to about 10,000; glycidylethers of polytetramethylene glycol or poly(oxyethyleneoxybutylene) random or block copolymers. In a specific embodiment, the cationically polymerizable component comprises a polyfunctional glycidylether that lacks a cyclohexane ring in the molecule. In another specific embodiment, the cationically polymerizable component includes a neopentyl glycol diglycidyl ether. In another specific embodiment, the cationically polymerizable component includes a 1,4 cyclohexanedimethanol diglycidyl ether.

Examples of commercially available preferred polyfunctional glycidylethers are Erisys™ GE 22 (Erisys™ products are available from Emerald Performance Materials™), Heloxy™ 48, Heloxy™ 67, Heloxy™ 68, Heloxy™ 107 (Heloxy™ modifiers are available from Momentive Specialty Chemicals), and Grilonit® F713. Examples of commercially available preferred monofunctional glycidylethers are Heloxy™ 71, Heloxy™ 505, Heloxy™ 7, Heloxy™ 8, and Heloxy™ 61.

In an embodiment, the epoxide is 3,4-epoxycyclohexylmethyl-3',4'-epoxycyclohexanecarboxylate (available as CELLOXIDE™ 2021P from Daicel Chemical, or as CYRACURE™ UVR-6105 from Dow Chemical), hydrogenated bisphenol A-epichlorohydrin based epoxy resin (available as EPON™ 1510 from Momentive), 1,4-cyclohexanedimethanol diglycidyl ether (available as HELOXY™ 107 from Momentive), a hydrogenated bisphenol A diglycidyl ether (available as EPON™ 825 from Momentive) a mixture of dicyclohexyl diepoxide and nanosilica (available as NANOPDX™), and any combination thereof.

In a specific embodiment, the cationic polymerizable component includes a cycloaliphatic epoxy, for example, a cycloaliphatic epoxy with 2 or more than 2 epoxy groups according to the following formula I:

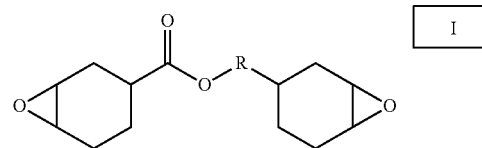

wherein R is a carbon atom, an ester-containing $C_1$-$C_{10}$ aliphatic chain, or a $C_1$-$C_{10}$ alkyl chain.

In another specific embodiment, the cationic polymerizable component includes an epoxy having an aromatic or aliphatic glycidyl ether group with 2 (difunctional) or more than 2 (polyfunctional) epoxy groups.

The above-mentioned cationically polymerizable compounds can be used singly or in combination of two or more thereof. In embodiments of the invention, the cationic polymerizable component further comprises at least two different epoxy components.

In other embodiments of the invention, the cationic polymerizable component also comprises an oxetane component. In a specific embodiment, the cationic polymerizable component includes an oxetane, for example, an oxetane containing 1, 2 or more than 2 oxetane groups. In another embodiment, the oxetane employed is monofunctional, and additionally possesses a hydroxyl group. According to an embodiment, the oxetane possesses the following structure:

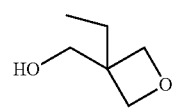

If utilized in the composition, the oxetane component is present in a suitable amount from about 5 to about 50 wt % of the resin composition. In another embodiment, the oxetane component is present in an amount from about 10 to about 25 wt % of the resin composition, and in yet another embodiment, the oxetane component is present in an amount from 20 to about 30 wt % of the resin composition.

The liquid radiation curable resin for additive fabrication can therefore include suitable amounts of the cationically curable component, for example, in certain embodiments, in an amount from about 10 to about 80% by weight of the resin composition, in further embodiments from about 20 to about 70 wt % of the resin composition, and in further embodiments from about 25 to about 65 wt % of the resin composition, in further preferred embodiments from about 30 to about 80 wt %, more preferably from about 50 to about 85 wt % of the resin composition Free-Radically Curable Component In accordance with an embodiment of the invention, the liquid radiation curable resin for additive fabrication of the invention comprises at least one free-radical curable component, that is, a component which undergoes polymerization initiated by free radicals. The free-radical polymerizable components are monomers, oligomers, and/or polymers; they are monofunctional or polyfunctional materials, i.e., have 1, 2, 3, 4, 5, 6, 7, 8, 9, 10 . . . 20 . . . 30 . . . 40 . . . 50 . . . 100, or more functional groups that can polymerize by free radical initiation, may contain aliphatic, aromatic, cycloaliphatic, arylaliphatic, heterocyclic moiety(ies), or any combination thereof. Examples of polyfunctional materials include dendritic polymers such as dendrimers, linear dendritic polymers, dendrigraft polymers, hyperbranched polymers, star branched polymers, and hypergraft polymers; see, e.g., US 2009/0093564 A1. The dendritic polymers may contain one type of polymerizable functional group or different types of polymerizable functional groups, for example, acrylates and methacrylate functions.

Examples of free-radical curable, or polymerizable, components include acrylates and methacrylates such as isobornyl (meth)acrylate, bornyl (meth)acrylate, tricyclodecanyl (meth)acrylate, dicyclopentanyl (meth)acrylate, di cyclopentenyl (meth)acrylate, cyclohexyl (meth)acrylate, benzyl (meth)acrylate, 4-butylcyclohexyl (meth)acrylate, acryloyl morpholine, (meth)acrylic acid, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, caprolactone acrylate, isoamyl (meth)acrylate, hexyl (meth)acrylate, heptyl (meth)acrylate, octyl (meth)acrylate, isooctyl (meth) acrylate, 2-ethylhexyl (meth)acrylate, nonyl (meth)acrylate, decyl (meth)acrylate, isodecyl (meth)acrylate, tridecyl (meth)acrylate, undecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, benzyl (meth)acrylate, phenoxyethyl (meth)acrylate, polyethylene glycol mono(meth)acrylate, polypropylene glycol mono(meth) acrylate, methoxyethylene glycol (meth)acrylate, ethoxyethyl (meth)acrylate, methoxypolyethylene glycol (meth) acrylate, methoxypolypropylene glycol (meth)acrylate, diacetone (meth)acrylamide, beta-carboxyethyl (meth)acrylate, phthalic acid (meth)acrylate, dimethylaminoethyl (meth)acrylate, diethylaminoethyl (meth)acrylate, butylcarbamylethyl (meth)acrylate, n-isopropyl (meth)acrylamide fluorinated (meth)acrylate, 7-amino-3,7-dimethyloctyl (meth)acrylate.

Examples of polyfunctional free-radical polymerizable components include those with (meth)acryloyl groups such as trimethylolpropane tri(meth)acrylate, pentaerythritol (meth)acrylate, ethylene glycol di(meth)acrylate, bisphenol A diglycidyl ether di(meth)acrylate, dicyclopentadiene dimethanol di(meth)acrylate, [2-[1,1-dimethyl-2-[(1-oxoallyl)oxy]ethyl]-5-ethyl-1,3-dioxan-5-yl]methyl acrylate; 3,9-bis(1,1-dimethyl-2-hydroxyethyl)-2,4,8,10-tetraoxaspiro [5.5]undecane di(meth)acrylate; dipentaerythritol monohydroxypenta(meth)acrylate, propoxylated trimethylolpropane tri(meth)acrylate, propoxylated neopentyl glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, polybutanediol di(meth)acrylate, tripropyleneglycol di(meth)acrylate, glycerol tri(meth)acrylate, phosphoric acid mono- and di(meth)acrylates, $C_7$-$C_{20}$ alkyl di(meth)acrylates, tris(2-hydroxyethyl)isocyanurate tri (meth)acrylate, tris(2-hydroxyethyl)isocyanurate di(meth) acrylate, pentaerythritol tri(meth)acrylate, pentaerythritol tetra(meth)acrylate, dipentaerythritol hexa(meth)acrylate, tricyclodecane diyl dimethyl di(meth)acrylate and alkoxylated versions (e.g., ethoxylated and/or propoxylated) of any of the preceding monomers, and also di(meth)acrylate of a diol which is an ethylene oxide or propylene oxide adduct to bisphenol A, di(meth)acrylate of a diol which is an ethylene oxide or propylene oxide adduct to hydrogenated bisphenol A, epoxy (meth)acrylate which is a (meth)acrylate adduct to bisphenol A of diglycidyl ether, diacrylate of polyoxyalkylated bisphenol A, and triethylene glycol divinyl ether, and adducts of hydroxyethyl acrylate.

In accordance with an embodiment, the radically polymerizable component is a polyfunctional (meth)acrylate. The polyfunctional (meth)acrylates may include all methacryloyl groups, all acryloyl groups, or any combination of methacryloyl and acryloyl groups. In an embodiment, the free-radical polymerizable component is selected from the group consisting of bisphenol A diglycidyl ether di(meth)acrylate, ethoxylated or propoxylated bisphenol A or bisphenol F di(meth)acrylate, dicyclopentadiene dimethanol di(meth) acrylate, [2-[1,1-dimethyl-2-[(1-oxoallyl)oxy]ethyl]-5-ethyl-1,3-dioxan-5-yl]methyl acrylate, dipentaerythritol monohydroxypenta(meth)acrylate, dipentaerythritol penta (meth)acrylate, dipentaerythritol hexa(meth)crylate, propoxylated trimethylolpropane tri(meth)acrylate, and propoxylated neopentyl glycol di(meth)acrylate, and any combination thereof.

In an embodiment, the polyfunctional (meth)acrylate has more than 2 functional groups. According to another embodiment, the polyfunctional (meth)acrylate has more than 3 functional groups. In yet another embodiment, the polyfunctional (meth)acrylate has more than 4 functional groups. In another preferred embodiment, the radically polymerizable component consists exclusively of a single polyfunctional (meth)acrylate component. In further embodiments, the exclusive radically polymerizable component is tetra-functional, in further embodiments, the exclusive radically polymerizable component is penta-functional, and in further embodiments, the exclusive radically polymerizable component is hexa-functional.

In another embodiment, the free-radical polymerizable component is contains an aromatic (meth)acrylate. Aromatic acrylates may be derived from, as non-limiting examples, bisphenol-A, bisphenol-S, or bisphenol-F. In certain embodiments the aromatic selected from the group consisting of bisphenol A diglycidyl ether diacrylate, dicyclopentadiene dimethanol diacrylate, [2-[1,1-dimethyl-2-[(1-oxoallyl)oxy]ethyl]-5-ethyl-1,3-dioxan-5-yl]methyl acrylate, dipentaerythritol monohydroxypentaacrylate, propoxylated trimethylolpropane triacrylate, and propoxylated neopentyl glycol diacrylate, and any combination thereof. In an embodiment, the aromatic (meth)acrylate is difunctional.

In specific embodiments, the liquid radiation curable resins for additive fabrication of the invention include one or more of bisphenol A diglycidyl ether di(meth)acrylate, dicyclopentadiene dimethanol di(meth)acrylate, dipentaerythritol monohydroxypenta(meth)acrylate, propoxylated trimethylolpropane tri(meth)acrylate, and/or propoxylated neopentyl glycol di(meth)acrylate, and more specifically one or more of bisphenol A diglycidyl ether diacrylate, dicyclopentadiene dimethanol diacrylate, dipentaerythritol pentaacrylate, propoxylated trimethylolpropane triacrylate, and/or propoxylated neopentyl glycol diacrylate.

The above-mentioned radically polymerizable compounds can be used singly or in combination of two or more thereof. The liquid radiation curable resin for additive fabrication can include any suitable amount of the free-radical polymerizable components, for example, in certain embodiments, in an amount up to about 50 wt % of the resin composition, in certain embodiments, from about 2 to about 40 wt % of the resin composition, in other embodiments from about 5 to about 30 wt %, and in further embodiments from about 10 to about 20 wt % of the resin composition, in yet further preferred embodiments from about 8 to about 50 wt %, more preferably from about 15 to about 25 wt % of the resin composition.

Photoinitiators

In embodiments according to the present invention, the composition includes at least one photoinitiator. A photoinitiator is a compound that chemically changes due to the action of light (or the synergy between the action of light and the electronic excitation of a sensitizing dye) to produce at least one of a radical, an acid, and a base, whereupon the radical, acid, and/or base effectuates a polymerization reaction in one or more of the polymerizable substances present in the corresponding composition. According to embodiments of the first aspect of the present invention, the composition includes a photoinitiator useful to effectuate polymerization in the free-radically curable constituent, the cationically curable constituent, or both such constituents.

A photoinitiator which is capable (when subjected to light of an appropriate wavelength and/or intensity) of effectuating polymerization of the free-radically curable constituent is a free-radical photoinitiator. A photoinitiator which is capable (when subjected to light of an appropriate wavelength and/or intensity) of effectuating polymerization of the cationically curable constituent is a cationic photoinitiator. A particular photoinitiator may serve as both a free-radical photoinitiator and a cationic photoinitiator, although typically at least two different photoinitiators are employed for this purpose. In accordance with an embodiment, the liquid radiation curable resin composition includes a photoinitiating system contains at least one photoinitiator having a cationic initiating function, and at least one photoinitiator having a free radical initiating function. In another embodiment, the photoinitiating system can include a photoinitiator that contains both free-radical initiating function and cationic initiating function on the same molecule.

In embodiments, the liquid radiation curable resin for additive fabrication of the present invention includes a free-radical photoinitiator. Typically, free radical photoinitiators include those which form radicals by either a Norrish Type I or II mechanism. Such mechanisms are well-known in the art to which this invention applies, and are described in, for example, Parikh, A., Parikh, H., & Parikh, K. (2006). Norrish Type I and II Reaction (Cleavage). In Name Reactions in Organic Synthesis (pp. 325-329). Foundation Books. Such photoinitiators include those which form radicals by cleavage, known as "Norrish Type I", and those that form radicals by hydrogen abstraction, known as "Norrish type II". The Norrish type II photoinitiators require a hydrogen donor, which serves as the free radical source. As the initiation is based on a bimolecular reaction, the Norrish type II photoinitiators are generally slower than Norrish type I photoinitiators which are based on the unimolecular formation of radicals. On the other hand, Norrish type II photoinitiators possess better optical absorption properties in the near-UV spectroscopic region. Photolysis of aromatic ketones, such as benzophenone, thioxanthones, benzil, and quinones, in the presence of hydrogen donors, such as alcohols, amines, or thiols leads to the formation of a radical produced from the carbonyl compound (ketyl-type radical) and another radical derived from the hydrogen donor. The photopolymerization of vinyl monomers is usually initiated by the radicals produced from the hydrogen donor. The ketyl radicals are usually not reactive toward vinyl monomers because of the steric hindrance and the delocalization of an unpaired electron.

Inventors have presently found that not all compounds suitable for use to promote free-radical polymerization, and particularly for promoting polymerization of a radiation curable composition in an additive fabrication process utilizing a UV/vis light source, may be characterized under either of the two aforementioned groupings. To Inventors' surprise, some photoinitiators are effective at promoting free-radical (and potentially also cationic) polymerization, even though they do not utilize a Norrish Type I or Type II mechanism. A particular example of this includes certain iodonium salts, preferably an iodonium salt of a non-fluorinated borate anion. As used herein, "non-fluorinated" means not containing a fluorine atom. In addition to being non-fluorinated, the anion of the iodonium salt compound is preferably also non-halogenated. As used herein, "non-halogenated" means not containing any halogen group atoms.

To successfully formulate a liquid radiation curable resin for additive fabrication, it is of course necessary to review the wavelength sensitivity of the photoinitiator(s) present in the resin composition to determine if they will be activated by the radiation source chosen to provide the curing light.

In an embodiment, however, the composition comprises an iodonium salt photoinitiator of the following structure:

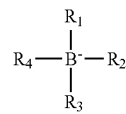

wherein $R_1$-$R_4$ are independently selected from the group consisting of alkyl, alkenyl, alkynyl, cycloalkyl, heterocycloalkyl, aryl, and heteroaryl, and further wherein (i) one or more substitutable carbon atoms of alkyl, alkenyl, or alkynyl is optionally substituted with hydroxy, carboxy, alkoxy, alkanoyl, hydroxyalkyl, carboxyalkyl, alkoxyalkyl, or alkanoylalkyl, or (ii) one or more substitutable carbon atoms of cycloalkyl, heterocycloalkyl, aryl, or heteroaryl is optionally substituted with alkyl, hydroxy, carboxy, alkoxy, alkanoyl, hydroxyalkyl, carboxyalkyl, alkoxyalkyl, or alkanoylalkyl.

In an embodiment, $R_1$-$R_4$ are independently selected from an aryl radical, optionally substituted at one or more substitutable carbon atoms with alkyl or alkoxy. More specifically, $R_1$-$R_4$ also may be a phenyl group, optionally independently substituted with an alkyl or alkoxy group, wherein the alkyl or the alkyl portion of the alkoxy group contains from 1-10 carbon atoms.

In an embodiment, the non-fluorinated borate anion of the iodonium salt is a tetraphenyl borate according to the following structure:

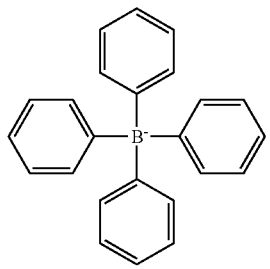 [SMILES: c1ccc([B-](c2ccccc2)(c2ccccc2)c2ccccc2)cc1]

The cation of the aforementioned iodonium salt of the non-fluorinated borate anion may be of any suitable type. In an embodiment, the iodonium salt possesses a diaryliodonium cation. In an embodiment, the cation is a diphenyliodonium salt having two phenyl radicals optionally substituted with an alkyl or alkoxy group, wherein the alkyl or alkyl portion of the alkoxy group possesses from 1-10 carbon atoms.

In an embodiment, the photoinitiator comprises one or both of the iodonium salt cations of the following structures:

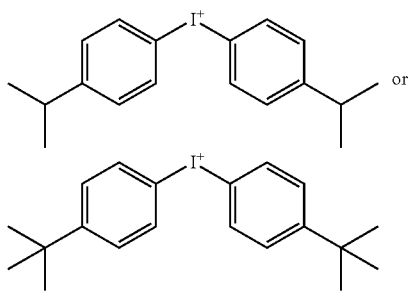

In an embodiment, the photoinitiator comprises bis 4-cumyl iodonium tetraphenyl borate or bis 4-tert-butyl iodonium tetraphenyl borate. Such compounds are available commercially as FP 5041 and FP 5028 from Hampford Research, respectively.

Inventors have discovered that free-radical and/or cationic polymerization may be maximized when a radiation curable composition is subjected to an additive fabrication system utilizing a light source employing UV/optics if the photoinitiator comprises, consists of, or consists essentially of one or more of the iodonium salt photoinitiators described above. Inventors have further surprisingly discovered that polymerization efficacy may not be improved—and may even be inhibited—by the further addition of other more well-known free-radical photoinitiators. In an embodiment, therefore, the composition according to the first aspect is substantially devoid of any Norrish Type I photoinitiators. In another embodiment, the composition is additionally or alternatively devoid of any Norrish Type II photoinitiators. In an embodiment, the composition contains an amount by weight of a Norrish Type I and/or Norrish Type II photoinitiator of less than about 0.1 wt-%, or less than about 0.05 wt-%, or less than about 0.01 wt-%, or about 0.00 wt. %.

In accordance with an embodiment, the liquid radiation curable resin for additive fabrication includes at least one free radical photoinitiator, e.g., those selected from the group consisting of benzoylphosphine oxides, aryl ketones, benzophenones, hydroxylated ketones, 1-hydroxyphenyl ketones, ketals, metallocenes, and any combination thereof.

Nonetheless, in some embodiments, the composition may possess further free-radical photoinitiators. In an embodiment, the liquid radiation curable resin for additive fabrication additionally includes at least one free-radical photoinitiator, such as but not limited to 2,4,6-trimethylbenzoyl diphenylphosphine oxide and 2,4,6-trimethylbenzoyl phenyl, ethoxy phosphine oxide, bis(2,4,6-trimethylbenzoyl)-phenylphosphineoxide, 2-methyl-1-[4-(methylthio)phenyl]-2-morpholinopropanone-1,2-benzyl-2-(dimethylamino)-1-[4-(4-morpholinyl) phenyl]-1-butanone, 2-dimethylamino-2-(4-methyl-benzyl)-1-(4-morpholin-4-yl-phenyl)-butan-1-one, 4-benzoyl-4'-methyl diphenyl sulphide, 4,4'-bis(diethylamino) benzophenone, and 4,4'-bis(N,N'-dimethylamino) benzophenone (Michler's ketone), benzophenone, 4-methyl benzophenone, 2,4,6-trimethyl benzophenone, dimethoxybenzophenone, 1-hydroxycyclohexyl phenyl ketone, phenyl (1-hydroxyisopropyl)ketone, 2-hydroxy-1-[4-(2-hydroxyethoxy) phenyl]-2-methyl-1-propanone, 4-isopropylphenyl(1-hydroxyisopropyl)ketone, oligo-[2-hydroxy-2-methyl-1-[4-(1-methylvinyl)phenyl] propanone], camphorquinone, 4,4'-bis(diethylamino) benzophenone, or benzil dimethyl ketal, bis(eta 5-2-4-cyclopentadien-1-yl) bis[2,6-difluoro-3-(1H-pyrrol-1-yl) phenyl] titanium, and any combination thereof.

For light sources emitting in the 300-475 nm wavelength range, especially those emitting at 365 nm, 390 nm, or 395 nm, examples of potentially suitable free-radical photoinitiators absorbing in this area include: benzoylphosphine oxides, such as, for example, 2,4,6-trimethylbenzoyl diphenylphosphine oxide (Lucirin TPO from BASF) and 2,4,6-trimethylbenzoyl phenyl, ethoxy phosphine oxide (Lucirin TPO-L from BASF), bis(2,4,6-trimethylbenzoyl)-phenylphosphineoxide (Irgacure 819 or BAPO from Ciba), 2-methyl-1-[4-(methylthio)phenyl]-2-morpholinopropanone-1 (Irgacure 907 from Ciba), 2-benzyl-2-(dimethylamino)-1-[4-(4-morpholinyl)phenyl]-1-butanone (Irgacure 369 from Ciba), 2-dimethylamino-2-(4-methyl-benzyl)-1-(4-morpholin-4-yl-phenyl)-butan-1-one (Irgacure 379 from Ciba), 4-benzoyl-4'-methyl diphenyl sulphide (Chivacure BMS from Chitec), 4,4'-bis(diethylamino) benzophenone (Chivacure EMK from Chitec), and 4,4'-bis(N,N'-dimethylamino) benzophenone (Michler's ketone). Also suitable are mixtures thereof.

According to an embodiment of the present invention, the free-radical photoinitiator may additionally include an acylphosphine oxide photoinitiator. Acylphosphine oxide photoinitiators are disclosed for example in U.S. Pat. Nos. 4,324,744, 4,737,593, 5,942,290, 5,534,559, 6,020,528, 6,486,228, and 6,486,226. The acylphosphine oxide photoinitiators include bisacylphosphine oxides (BAPO) and monoacylphosphine oxides (MAPO). Although generally, acyl phosphine oxide photoinitiators are preferred for use with UV/vis optics since they have a good delocalization of the phosphinoyl radical upon photo irradiation, when iodonium salt photoinitiators of a non-fluorinated borate anion are used, such phosphorous-containing photoinitiators are not necessarily needed, and may not facilitate curing much or even at all. Therefore, in an embodiment, the composition is substantially devoid of a free-radical phosphorous-containing photoinitiator, or contains an amount by weight of a free-radical phosphorous-containing photoinitiator of less than about 0.1 wt-%, preferably less than about 0.05 wt-%, or preferably less than about 0.01 wt-%, or about 0.00 wt. %.

The liquid radiation curable resin for additive fabrication can include any suitable amount of the free-radical photoinitiator as prescribed herein, for example, in certain embodiments, in an amount up to about 10 wt % of the resin composition, in certain embodiments, from about 0.1 to about 10 wt % of the resin composition, and in further embodiments from about 1 to about 6 wt % of the resin composition.

In accordance with some embodiments, the liquid radiation curable resin composition includes a cationic photoinitiator. The cationic photoinitiator initiates cationic ring-opening polymerization upon irradiation of light. In a preferred embodiment, the cationic photoinitiator comprises, consists of, or consists essentially of iodonium salt-based cationic photoinitiators.

In an embodiment, any suitable iodonium-based cationic photoinitiator can be used, for example, those with cations selected from the group consisting of diaryl iodonium salts, triaryl iodonium salts, aromatic iodonium salts, and any combination thereof.

In another embodiment, the cation of the cationic photoinitiator is selected from the group consisting of aromatic diazonium salts, aromatic sulfonium salts, aromatic iodonium salts, metallocene based compounds, aromatic phosphonium salts, acylsulfonium salts, and any combination thereof. In another embodiment, the cation is a polymeric sulfonium salt, such as in U.S. Pat. Nos. 5,380,923 or 5,047,568, or other aromatic heteroatom-containing cations and naphthyl-sulfonium salts such as in U.S. Pat. Nos. 7,611,817, 7,230,122, US2011/0039205, US2009/0182172, U.S. Pat. No. 7,678,528, EP2308865, WO2010046240, or EP2218715. In another embodiment, the cationic photoinitiator is selected from the group consisting of triarylsulfonium salts, diaryliodonium salts, and metallocene based compounds, and any combination thereof. Onium salts, e.g., iodonium salts and sulfonium salts, and ferrocenium salts, have the advantage that they are generally more thermally stable.

In a particular embodiment, the cationic photoinitiator has an anion selected from the group consisting of $BF_4^-$, $AsF_6^-$, $SbF_6^-$, $PF_6^-$, $[B(CF_3)_4]^-$, $B(C_6F_5)_4^-$, $B[C_6H_3\text{-}3,5(CF_3)_2]_4^-$, $B(C_6H_4CF_3)_4^-$, $B(C_6H_3F_2)_4^-$, $B[C_6F_4\text{-}4(CF_3)]_4^-$, $Ga(C_6F_5)_4^-$, $[(C_6F_5)_3B\text{---}C_3H_3N_2\text{---}B(C_6F_5)_3]^-$, $[(C_6F_5)_3B\text{---}NH_2\text{---}B(C_6F_5)_3]^-$, tetrakis(3,5-difluoro-4-alkyloxyphenyl)borate, tetrakis(2,3,5,6-tetrafluoro-4-alkyloxyphenyl)borate, perfluoroalkylsulfonates, tris[(perfluoroalkyl)sulfonyl]methides, bis[(perfluoroalkyl)sulfonyl]imides, perfluoroalkylphosphates, tris(perfluoroalkyl)trifluorophosphates, bis(perfluoroalkyl)tetrafluorophosphates, tris(pentafluoroethyl)trifluorophosphates, and $(CH_6B_{11}Br_6)^-$, $(CH_6B_{11}Cl_6)^-$ and other halogenated carborane anions.

A survey of other onium salt initiators and/or metallocene salts can be found in "UV Curing, Science and Technology", (Editor S. P. Pappas, Technology Marketing Corp., 642 Westover Road, Stamford, Conn., U.S.A.) "Chemistry & Technology of UV & EB Formulation for Coatings, Inks & Paints", Vol. 3 (edited by P. K. T. Oldring), or J. P. Fouassier, J. Lavelee, "Photoinitiators for polymer synthesis" Wiley 2012 ISBN978-3-527-33210-6.

In an embodiment, the cationic photoinitiator has a cation selected from the group consisting of aromatic sulfonium salts, aromatic iodonium salts, and metallocene based compounds with at least an anion selected from the group consisting of $SbF_6^-$, $PF_6^-$, $B(C_6F_5)_4^-$, $[B(CF_3)_4]^-$, tetrakis(3,5-difluoro-4-methoxyphenyl)borate, perfluoroalkylsulfonates, perfluoroalkylphosphates, tris[(perfluoroalkyl)sulfonyl]methides, and $[(C_2F_5)_3PF_3]^-$.

Examples of known cationic photoinitiators include 4-[4-(3-chlorobenzoyl)phenylthio]phenylbis(4-fluorophenyl) sulfonium hexafluoroantimonate, 4-[4-(3-chlorobenzoyl)phenylthio]phenylbis(4-fluorophenyl)sulfonium tetrakis(pentafluorophenyl)borate, 4-[4-(3-chlorobenzoyl)phenylthio]phenylbis(4-fluorophenyl)sulfonium tetrakis(3,5-difluoro-4-methyloxyphenyl)borate, 4-[4-(3-chlorobenzoyl)phenylthio]phenylbis(4-fluorophenyl) sulfonium tetrakis(2,3,5,6-tetrafluoro-4-methyloxyphenyl)borate, tris(4-(4-acetylphenyl)thiophenyl)sulfonium tetrakis(pentafluorophenyl)borate (Irgacure® PAG 290 from BASF), tris(4-(4-acetylphenyl)thiophenyl)sulfonium tris[(trifluoromethyl)sulfonyl]methide (Irgacure® GSID 26-1 from BASF), tris(4-(4-acetylphenyl)thiophenyl)sulfonium hexafluorophosphate (Irgacure® 270 from BASF), and HS-1 available from San-Apro Ltd.

Known cationic photoinitiators include, either alone or in a mixture: bis[4-diphenylsulfoniumphenyl]sulfide bishexafluoroantimonate; thiophenoxyphenylsulfonium hexafluoroantimonate (available as Chivacure 1176 from Chitec), tris(4-(4-acetylphenyl)thiophenyl)sulfonium tetrakis(pentafluorophenyl)borate (Irgacure® PAG 290 from BASF), tris(4-(4-acetylphenyl)thiophenyl)sulfonium tris[(trifluoromethyl)sulfonyl]methide (Irgacure® GSID 26-1 from BASF), and tris(4-(4-acetylphenyl)thiophenyl)sulfonium hexafluorophosphate (Irgacure® 270 from BASF), [4-(1-methylethyl)phenyl](4-methylphenyl) iodonium tetrakis(pentafluorophenyl)borate (available as Rhodorsil 2074 from Rhodia), (4-octyloxyphenyl) phenyliodonium hexafluoroantimonate (available as OPPI FP 5386 from Hampford), 4-[4-(2-chlorobenzoyl)phenylthio]phenylbis(4-fluorophenyl)sulfonium hexafluoroantimonate (as SP-172 from Adeka), SP-300 from Adeka, and aromatic sulfonium salts with anions of $(PF_{6-m}(C_nF_{2n+1})_m)^-$ where m is an integer from 1 to 5, and n is an integer from 1 to 4 (available as CPI-200K or CPI-200S, which are monovalent sulfonium salts from San-Apro Ltd., TK-1 available from San-Apro Ltd., or HS-1 available from San-Apro Ltd.).

In an embodiment of the invention, the liquid radiation curable resin for additive fabrication comprises an aromatic triaryl sulfonium salt cationic photoinitiator. Use of aromatic triaryl sulfonium salts in additive fabrication applications is known. Please see US 20120251841 to DSM IP Assets, B.V., U.S. Pat. No. 6,368,769, to Asahi Denki Kogyo, which discusses aromatic triaryl sulfonium salts with tetraryl borate anions, including tetrakis(pentafluorophenyl)borate, and use of the compounds in stereolithography applications. Triarylsulfonium salts are disclosed in, for example, J Photopolymer Science & Tech (2000), 13(1), 117-118 and J Poly Science, Part A (2008), 46(11), 3820-29. Triarylsulfonium salts $Ar_3S^+MXn^-$ with complex metal halide anions such as $BF_4^-$, $AsF_6^-$, $PF_6^-$ and $SbF_6^-$, are disclosed in J Polymr Sci, Part A (1996), 34(16), 3231-3253.

An example of a triaryl sulfonium tetrakis(pentafluorophenyl)borate cationic photoinitiator is tris(4-(4-acetylphenyl)thiophenyl)sulfonium tetrakis(pentafluorophenyl)borate. Tris(4-(4-acetylphenyl)thiophenyl)sulfonium tetrakis (pentafluorophenyl)borate is known commercially as IRGACURE® PAG-290, and is available from Ciba/BASF.

In another embodiment, the cationic photoinitiator is an aromatic triaryl sulfonium salt that possesses an anion represented by $SbF_6^-$, $PF_6^-$, $BF_4^-$, $(CF_3CF_2)_3PF_3^-$, $(C_6F_5)_4B^-$, $((CF_3)_2C_6H_3)_4B^-$, $(C_6F_5)_4Ga^-$, $((CF_3)_2C_6H_3)_4Ga^-$, trifluoromethanesulfonate, nonafluorobutanesulfonate, methanesulfonate, butanesulfonate, benzenesulfonate, or p-toluenesulfonate. Such photoinitiators are described in, for example, U.S. Pat. No. 8,617,787.

Another cationic photoinitiator is an aromatic triaryl sulfonium cationic photoinitiator has an anion that is a fluoroalkyl-substituted fluorophosphate. Commercial examples of an aromatic triaryl sulfonium cationic photoinitiator having a fluoroalkyl-substituted fluorophosphate anion is the CPI-200 series (for example CPI-200K® or CPI-2105®) or 300 series, available from San-Apro Limited.

The liquid radiation curable resin composition can include any suitable amount of the cationic photoinitiator, for example, in certain embodiments, in an amount up to about 15% by weight of the resin composition, in certain embodiments, up to about 5% by weight of the resin composition, and in further embodiments from about 2% to about 10% by weight of the resin composition, and in other embodiments, from about 0.1% to about 5% by weight of the resin composition. In a further embodiment, the amount of cationic photoinitiator is from about 0.2 wt % to about 4 wt % of the total resin composition, and in other embodiments from about 0.5 wt % to about 3 wt %.

Photosensitizers

In some embodiments, depending on the wavelength of light used for curing the liquid radiation curable resin, it is desirable for the liquid radiation curable resin composition to include a photosensitizer. The term "photosensitizer" is used to refer to any substance that either increases the rate of photoinitiated polymerization or shifts the wavelength at which polymerization occurs; see textbook by G. Odian, Principles of Polymerization, 3$^{rd}$ Ed., 1991, page 222. Substances which operate by way of the latter definition, and are used in conjunction with photoinitiators that would otherwise not absorb light of a specific wavelength are said to operate by way of an "indirect excitation" mechanism with their associated photoinitiator. Applicants have harnessed this mechanism to formulate compositions of the current invention which are suitable for cure via UV/vis optics.

A variety of compounds can be used as photosensitizers, including heterocyclic and fused-ring aromatic hydrocarbons, organic dyes, and aromatic ketones. Examples of photosensitizers include those selected from the group consisting of methanones, xanthenones, pyrenemethanols, anthracenes, pyrene, perylene, quinones, xanthones, thioxanthones, benzoyl esters, benzophenones, and any combination thereof. Particular examples of photosensitizers include those selected from the group consisting of [4-[(4-methylphenyl)thio]phenyl]phenyl-methanone, isopropyl-9H-thioxanthen-9-one, 1-pyrenemethanol, 9-(hydroxymethyl)anthracene, 9,10-diethoxyanthracene, 9,10-dimethoxyanthracene, 9,10-dipropoxyanthracene, 9,10-dibutyloxyanthracene, 9-anthracenemethanol acetate, 2-ethyl-9,10-dimethoxyanthracene, 2-methyl-9,10-dimethoxyanthracene, 2-t-butyl-9,10-dimethoxyanthracene, 2-ethyl-9,10-diethoxyanthracene and 2-methyl-9,10-diethoxyanthracene, anthracene, anthraquinones, 2-methylanthraquinone, 2-ethylanthraquinone, 2-tertbutylanthraquinone, 1-chloroanthraquinone, 2-amylanthraquinone, thioxanthones and xanthones, isopropyl thioxanthone, 2-chlorothioxanthone, 2,4-diethylthioxanthone, 1-chloro-4-propoxythioxanthone, methyl benzoyl formate (Darocur MBF from BASF), methyl-2-benzoyl benzoate (Chivacure OMB from Chitec), 4-benzoyl-4'-methyl diphenyl sulphide (Chivacure BMS from Chitec), 4,4'-bis(diethylamino) benzophenone (Chivacure EMK from Chitec), and any combination thereof.

The novel mixtures may also contain various photoinitiators of different sensitivity to radiation of emission lines with different wavelengths to obtain a better utilization of a UV light source. The use of known photoinitiators of different sensitivity to radiation of emission lines is well known in the art of additive fabrication, and may be selected in accordance with radiation sources of, for example, 351, nm 355 nm, 365 nm, 385 nm, and 405 nm. In this context it is advantageous for the various photoinitiators to be selected such, and employed in a concentration such, that equal optical absorption is produced with the emission lines used.

In an embodiment, the photosensitizer is a fluorone, e.g., 5,7-diiodo-3-butoxy-6-fluorone, 5,7-diiodo-3-hydroxy-6-fluorone, 9-cyano-5,7-diiodo-3-hydroxy-6-fluorone, or a photosensitizer is

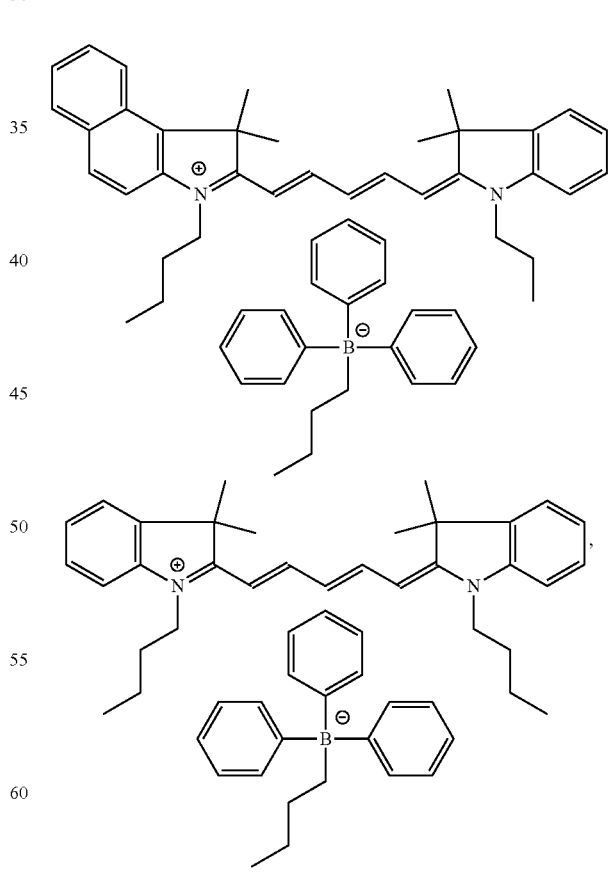

and any combination thereof.

When photosensitizers are employed, other photoinitiators absorbing at shorter wavelengths can be used. Examples of such photoinitiators include: benzophenones, such as benzophenone, 4-methyl benzophenone, 2,4,6-trimethyl benzophenone, and dimethoxybenzophenone, and 1-hydroxyphenyl ketones, such as 1-hydroxycyclohexyl phenyl ketone, phenyl (1-hydroxyisopropyl)ketone, 2-hydroxy-1-[4-(2-hydroxyethoxy) phenyl]-2-methyl-1-propanone, and 4-isopropylphenyl(1-hydroxyisopropyl)ketone, benzil dimethyl ketal, and oligo-[2-hydroxy-2-methyl-1-[4-(1-methylvinyl)phenyl]propanone] (Esacure KIP 150 from Lamberti).

It can be noted that some cationic photoinitiators have low absorption at the preferred actinic wavelength. For example, in an embodiment, an additive fabrication application of interest utilizes UV/optics having a peak intensity at about 400 nm. Iodonium salts, such as, for example, Rhodorsil 2074, available from Rhodia Silicones, Irgacure 250 Iodonium, (4-methylphenyl)[4-(2-methylpropyl)phenyl]-hexafluorophosphate(1-) available from Ciba, and UV9380c, available from GE Silicones, have insufficient direct absorption at the preferred wavelength and therefore require excessive concentration or require a sensitizer. Therefore, triplet sensitizers such as thioxanthones and Michelers ketone are sometimes used to absorb the actinic energy and then transfer the energy to the iodonium initiator in an efficient manner. However, some thioxanthones and Michelers ketones are prone to orange or red color formation, safety concerns, and, while they have significant actinic absorption out to 430 nm, they are not very effective at sensitizing the photoreaction at curing light wavelengths of about 400 nm.

In an embodiment, however, chloropropyl thioxanthone (CPTX) is a suitable sensitizer for iodonium initiators especially for use in stereolithography since it does not have significant light absorption above 500 nm and creates articles with less color.

In order to reduce the concentration of sensitizers used in a formulation and prevent adverse effects that may result from relatively large concentrations of sensitizers on the final physical properties of the composition, it is preferable to use sensitizers with high extinction coefficients at 400 nm. For example, benzophenone may, in some cases, act as a triplet sensitizer, but at laser wavelengths of, for example, a frequency tripled YAG laser (Coherent AVIA model #355-1800) operating at approximately 355 nm, the extinction coefficient is on the order of 108 liters/mole-cm. On the other hand, CPTX at the using the same laser at the same laser wavelength of approximately 400 nm, has an extinction coefficient of almost X times that of benzophenone, 2585 liters/mole-cm. This suggests that CPTX may require 1/X the concentration in a formulation to provide an equivalent light absorption effect. It is, therefore, preferred—although not required—for the sensitizer to have an extinction coefficient greater than 300 liters/mole-cm, or higher such as greater than 1000 liters/mole-cm, and preferably greater than 2000 liters/mole-cm at curing light wavelengths greater than 380 nm.

While CPTX may be used to improve the activity of the cationic photoinitiator, the sensitizer used in combination with the above-mentioned cationic photoinitiators is not necessarily limited thereto. A variety of compounds can be used as photosensitizers, including heterocyclic and fused-ring aromatic hydrocarbons, organic dyes, and aromatic ketones. Examples of sensitizers include compounds disclosed by J. V. Crivello in *Advances in Polymer Science*, 62, 1 (1984), and by J. V. Crivello & K. Dietliker, "Photoinitiators for Cationic Polymerization" in Chemistry & technology of UV & EB formulation for coatings, inks & paints. Volume III, Photoinitiators for free radical and cationic polymerization. by K. Dietliker; [Ed. by P.K.T. Oldring], SITA Technology Ltd, London, 1991. Specific examples include polyaromatic hydrocarbons and their derivatives such as anthracene, pyrene, perylene and their derivatives, substituted thioxanthones, α-hydroxyalkylphenones, 4-benzoyl-4'-methyldiphenyl sulfide, acridine orange, and benzoflavin.

In an embodiment, the liquid radiation curable composition for additive fabrication according to the first aspect of the invention contains a photosensitizer possessing a structure according to the following structure:

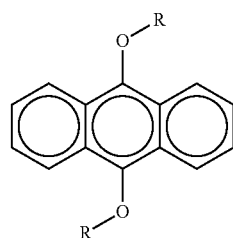

wherein R contains an aliphatic chain from $C_1$-$C_{20}$;

In an embodiment, the photosensitizer employed is an anthracene-based photoinitiator. Commercially available of such photosensitizers include Anthracure™ UVS-1101 and UVS-1331, available from Kawasaki Chemical.

The photosensitizer is present in any suitable amount from about 0.5 wt. % to about 10 wt. %, more preferably from 0.5 wt. % to 3 wt. %.

The liquid radiation curable resin for additive fabrication can include any suitable amount of the other cationic photoinitiator or photosensitizer, for example, in certain embodiments, in an amount an amount from 0.1 to 10 wt % of the resin composition, in certain embodiments, from about 1 to about 8 wt % of the resin composition, and in further embodiments from about 2 to about 6 wt % of the resin composition. In an embodiment, the above ranges are particularly suitable for use with epoxy monomers. In another embodiment, the photosensitizer may be employed in an amount of from about 0.05% to about 2% by weight of the total composition to which it is incorporated.

Reductants

As used herein, reductants are components that lose, or "donate", one or more electrons to the cationic photoinitiator component in a redox chemical reaction during polymerization of the liquid radiation compositions for additive fabrication according to the current invention. Such components are still considered to be reductants for present purposes even though they may not possess the ability to readily donate an electron until they have formed or decomposed into a free-radical after dissociation, or otherwise have entered an excited state upon being subjected to actinic radiation at UV/vis wavelengths. As such, they may be alternatively referred to herein as "activated reductants".

Photoinitiated cationic polymerization of monomers, such as epoxides and vinyl ethers, plays a necessary role in hybrid cure additive fabrication applications. Because of the additives used in different applications, when targeting a specific spectral sensitivity, the wavelength flexibility of photoinitiation becomes a fundamental factor in determining the curing performance of specific formulations. Therefore, photoinitiating systems for cationic polymerization that are sensitive particularly to longer wavelengths, such as those emitted by modern UV/vis optics, are increasingly important. Many of the existing photoinitiating systems for cationic polymerization are based on the use of certain onium salts, such as diphenyliodonium, triphenylsulfonium, and alkoxypyridinium salts. However, these salts do not absorb significantly (if at all) in the UV/vis spectra unless additional chromophores are incorporated into the salt structure. Therefore, it is important to find alternative ways to synthetically extend the sensitivity range of easily available onium salts to UV/vis wavelengths, especially in light of the fact that commercially-available photoinitiators that are already designed to absorb in the UV/vis spectra are unsuitable for incorporation into hybrid cure systems for additive fabrication for other reasons.

This has been known to be achieved with the aid of a combination of sensitizers via a mechanism called indirect excitation. Additionally, onium salts act as electron acceptors in redox reactions with free radicals, electron donor compounds in charge transfer complexes, and long-living electronically excited states of sensitizers, respectively. Among these approaches, so-called "free radical promoted" cationic polymerization seems to be an additional effective and flexible way to generate cationic species capable of initiating the cationic polymerization of monomers. The overall mechanism involves oxidation of photochemically formed radicals by onium salts (On+) with suitable reduction potentials:

$$R\cdot + ON+ \rightarrow R+ \quad (1)$$

Potential reductants remarked as having facilitating free radical promoted cationic polymerization generally include some of the aforementioned free-radical photoinitiators such as acylphosphine oxides, along with amines, benzoin and its derivatives, o-phataldehyde, polysilanes, and compounds having electron-donating substituents attached to a vinyl group such as vinyl ethers or vinyl halides, to name a few.

Amines are considered to be efficient hydrogen donors, and by virtue of chain transfer mechanisms will readily form free-radicals which will reduce a cationic photoinitiator with which they are associated. Therefore, in certain embodiments, they can act as suitable reductants. However, caution needs to be taken when including such compounds in hybrid radiation curable compositions for additive fabrication because of the known tendency for their included nitrogen atom to otherwise inhibit cationic polymerization reactions.

There exist several systems to generate oxidizable radicals in the presence of UV/vis light sources. For instance, radicals formed by the irradiation of systems containing a xanthene dye and an aromatic amine can serve as reductants to a diphenyliodonium salt. Similarly, the dimanganese decacarbonyl-organic halide combination is an efficient reductant for cationic polymerization at UV/vis wavelengths when used in conjunction with onium salts. Additionally, a commercial titanocene type photoinitiator, such as Irgacure 784, can be used as a reductant source generated by irradiation with visible light.

Preferably, the reductant comprises, consists of, or consists essentially of a component possessing an electron-donating substituent attached to a vinyl group. Such a component can further provide a mechanism by which to improve the cationic cure of liquid radiation curable compositions for additive fabrication systems employing UV/vis optics. Such compounds such as vinyl ethers are avoided in many modern commercial hybrid curable compositions which are subjected to additive fabrication systems employing traditional UV-based radiation sources due to their tendency to (1) produce excessive heat due to the exothermic reaction of their rapid polymerization; and (2) induce co-polymerization and a concomitantly heterogeneous polymer, thereby producing three dimensional parts with inconsistent and inferior physical properties. Nonetheless, their inclusion in compositions tailored for systems utilizing UV/vis optics with lower energies/intensities becomes desirable if used with the other required components according to the present invention. Specifically, the inclusion of an additional component possessing an electron-donating substituent attached to a vinyl group synergistically improves the polymerization.

One preferred example of a component possessing an electron-donating substituent attached to a vinyl group is vinyl ether. Vinyl ethers can be created from a variety of starting materials such as ethers, esters or biscarbamates, or vinyl ether terminated (poly) urethane or carbonates. Some non-limiting examples of each are included below:

Vinyl ether monomers from ethers: Specific examples of polyfunctional vinyl ethers include divinyl ether such as ethylene glycol divinyl ether, diethylene glycol divinyl ether, triethylene glycol divinyl ether, polyethylene glycol divinyl ether, propylene glycol divinyl ether, dipropylene glycol divinyl ether, isobutyl vinyl ether, butylene glycol divinyl ether, butanediol divinyl ether, hexanediol divinylether, cyclohexanediol divinyl ether, bisphenol A alkylene oxide divinyl ether, and bisphenol F alkylene oxide divinyle ether; and polyfunctional vinyl ethers such as trimethylolethane trivinyl ether, trimethylolpropane trivinyl ether, ditrimethylolpropane tetravinyl ether, glycerol trivinyl ether, pentaerythritol tetravinyl ether, pentaerythritol divinyl ether dipentaerythritol pentavinyl ether, dipentaerythritol hexavinyl ether, an ethylene oxide adduct of trimethylolpropane trivinyl ether, a propylene oxide adduct of trimethylolpropane trivinyl ether, an ethylene oxide adduct of ditrimethylolpropane tetravinyl ether, a propylene oxide adduct of ditrimethylolpropane tetravinyl ether, an ethylene oxide adduct of pentaerythritol tetravinyl ether, an propylene oxide adduct of pentaerythritol tetravinyl ether, an ethylene oxide adduct of dipentaerythritol hexavinyl ether, an propylene oxide adduct of dipentaerythritol hexavinyl ether.

Vinyl ether monomers from esters or biscarbamate: Specific examples of polyfunctional vinyl ethers such as divinyl adipate, divinyl terephthalate, divinyl cyclohexyl dicaroxylate. Bis[4-(vinyloxy)butyl] adipate (VEctomer® 4060), bis [4-(vinyloxy)butyl] succinate (VEctomer® 4030), bis[4-(vinyloxy)butyl] isophthalte (VEctomer® 4010), bis[4-(vinyloxymethyl)cyclohexylmethyl] glutarate (VEctomer® 4020), tris[4-(vinyloxy)butyl] trimellitate (VEctomer® 5015), bis[4-(vinyloxymethyl)cyclohexylmethyl]isophthalate (VEctomer® 4040), bis[4-(vinyloxy)butyl](4-methyl-1, 3-phenylene) biscarbamate (VEctomer® 4220) and bis[4-(vinyloxy)butyl](methylenedi-4,1-phenylene) biscarbamate (VEctomer® 4210) etc.

Vinyl ether terminated urethanes or carbonate: Specific examples of polyfunctional vinyl ether, such as polyurethane or polycarbonate endcapped with hydroxy vinyl ether in which it has at least a hydroxyl group and at least a vinyl ether group in intramolecular. For example, 2-hydroxyethyl vinyl ether, 3-hydroxypropyl vinyl ether, 2-hydroxypropyl vinyl ether, 2-hydroxy isopropyl vinyl ether, 4-hydroxybutyl vinyl ether, 3-hydroxybutylvinyl ether, 2-hydroxybutylvinyl ether, 3-hydroxy isobutyl vinyl ether, 2-hydroxy isobutyl vinyl ether, 1-methyl-3-hydroxypropyl vinyl ether, 1-methyl-2-hydroxypropyl vinyl ether, 1-hydroxy methylpropyl vinyl ether, 4-hydroxycyclohexylvinyl ether, 1,6-hexanediol monovinyl ether, 1,4-cyclohexane dimethanol monovinyl ether, 1,3-cyclohexane dimethanol monovinyl ether, 1,2-cyclohexane dimethanol monovinyl ether, p-xylene glycol monovinyl ether, m-xylene glycol monovinyl ether, o-xylene glycol monovinyl ether, diethylene-glycol monovinyl ether, Triethylene glycol monovinyl ether, tetraethylene glycol monovinyl ether, Pentaethylene glycol monovinyl ether, oligo ethylene glycol monovinyl ether, Polyethylene-glycol monovinyl ether, dipropylene glycol monovinyl ether, Tripropylene glycol monovinyl ether, tetrapropylene glycol monovinyl ether, These derivatives, such as pentapropylene glycol monovinyl ether, oligo propylene glycol monovinyl ether, and polypropylene-glycol monovinyl ether, and so on.

In a preferred embodiment, the component possessing an electron-donating substituent attached to a vinyl group is one or more of the following: vinyl ether, vinyl ester, vinyl thioether, n-vinyl carbazole, n-vinylpyrrolidone, n-vinyl caprolactam, allyl ether, and vinyl carbonate.

In another a preferred embodiment, the component possessing an electron-donating substituent attached to a vinyl group is multifunctional. As used herein, "multifunctional" means the vinyl ether possesses at least two vinyl groups per molecule.

One or more of the aforementioned components possessing an electron-donating substituent attached to a vinyl group can be employed in compositions according to the present invention in any suitable amount, and may be chosen singly or in combination of one or more of the types enumerated herein. In a preferred embodiment, the component possessing an electron-donating substituent attached to a vinyl group is present in an amount, relative to the entire weight of the composition, of from about 1 wt. % to about 25 wt. %, more preferably from about 5 wt. % to about 20 wt. %, more preferably about 5 wt. % to about 12 wt. %. In another embodiment, the component possessing an electron-donating substituent attached to a vinyl group is present in an amount from 1 wt. % to 15 wt. %, more preferably from 1 wt. % to 10 wt %, more preferably from 3 wt. % to about 8 wt. %.

Additives

Stabilizers are often added to the resin compositions in order to further prevent a viscosity build-up, for instance a viscosity build-up during usage in a solid imaging process. Useful stabilizers include those described in U.S. Pat. No. 5,665,792. The presence of a stabilizer is optional. In a specific embodiment, the liquid radiation curable resin composition for additive fabrication comprises from 0.1 wt % to 3% of a stabilizer.

Other possible additives include organic and inorganic fillers, dyes, pigments, antioxidants, wetting agents, bubble breakers, chain transfer agents, leveling agents, defoamers, surfactants and the like. Such additives are known and can be generally employed as is desirable for a particular application, as will be appreciated by one of ordinary skill in the art.

The liquid radiation curable resin composition for additive fabrication of the invention can further include one or more additives selected from the group consisting of bubble breakers, antioxidants, surfactants, acid scavengers, pigments, dyes, thickeners, flame retardants, silane coupling agents, ultraviolet absorbers, resin particles, core-shell particle impact modifiers, soluble polymers and block polymers.

Additionally, many of the known liquid radiation curable resin compositions for additive fabrication use hydroxy-functional compounds to enhance the properties of the parts made from the resin compositions. If present, any hydroxy group may be employed for the particular purpose. If present, the hydroxyl-containing material preferably contains one or more primary or secondary aliphatic hydroxyl. The hydroxyl group may be internal in the molecule or terminal. Monomers, oligomers or polymers can be used. The hydroxyl equivalent weight, i.e., the number average molecular weight divided by the number of hydroxyl groups, is preferably in the range of 31 to 5000. If present, the resin composition preferably comprises, relative to the total weight of the resin composition, at most 10 wt % of one or more non-free radical polymerizable hydroxy-functional compounds, more preferably at most 5 wt %, and most preferably at most 2 wt %.

A second aspect of the claimed invention is a method of forming a three-dimensional article via an additive fabrication system utilizing UV/vis optics, the method comprising:
(1) providing the liquid radiation curable composition for additive fabrication of the first aspect of the invention;
(2) establishing a first liquid layer of the liquid radiation curable resin;
(3) exposing the first liquid layer imagewise to actinic radiation via a UV/vis optics configuration to form an imaged cross-section, thereby forming a first cured layer;
(4) forming a new layer of liquid radiation curable resin in contact with the first cured layer;
(5) exposing said new layer imagewise to actinic radiation to form an additional imaged cross-section; and
(6) repeating steps (4) and (5) a sufficient number of times in order to build up a three-dimensional article;
wherein the UV/vis optics emit radiation at a peak spectral intensity from about 375 nm to about 500 nm, more preferably from about 380 nm to about 450 nm, more preferably from about 390 nm to about 425 nm, more preferably from about 395 nm to about 410 nm.

The liquid radiation curable composition provided in the second aspect of the invention as mentioned above must be suitable for cure via additive fabrication systems utilizing UV/vis optics. Such compositions are described in the first aspect of the current invention. In establishing a first liquid layer or forming a new layer of the liquid radiation curable resin, a layer may be of any suitable thickness and shape, and is dependent on the additive fabrication process utilized. For example, it may be selectively dispensed via jetting, or it may be added by dipping the previously cured layer into a vat of resin, producing a layer of substantially uniform thickness, as is typical with most stereolithography processes. It another non-limiting embodiment, it may alternatively be transferred via a foil, film or carrier in a predefined thickness via a cartridge or dispenser.

In the above, "exposing" refers to irradiating with actinic radiation. As noted previously, the inventive liquid radiation compositions for additive fabrications as described herein are particularly suitable for imparting hybrid cure via UV/vis optics. In an embodiment, the UV/vis optics utilize one or more LEDs as a light source. In an embodiment, the light source is a laser. In an embodiment, the LED or laser light source is coupled to a DLP or LCD image projection system. In an embodiment wherein the image projection systems includes an LCD display, the light source may be configured to emit actinic radiation exclusively above 400 nm, to minimize the detrimental effect UV wavelengths have upon LCD componentry.

The third aspect of the claimed invention is the three-dimensional part formed by the second aspect of the invention using the liquid radiation curable composition of the first aspect of the invention.

The following examples further illustrate the invention but, of course, should not be construed as in any way limiting its scope.

EXAMPLES

These examples illustrate embodiments of the liquid radiation curable resins for additive fabrication of the instant invention. Table 1 describes the various components of the liquid radiation curable resins for additive fabrication used in the present examples.

TABLE 1

| Component | Chemical Descriptor | Supplier/Manufacturer |
|---|---|---|
| OXT-101 | 3-Ethyl-3-hydroxymethyl-oxetane | Toagosei |
| Celloxide 2021P | 3',4'-Epoxycyclohexane)methyl 3,4-epoxycyclohexylcarboxylate | Daicel Chemical |
| polyTHF$_{1000}$ | Polytetramethylene glycol, molecular weight 1000 g/mol | Invista |
| CN 110 | Bisphenol A Diglycidyl Diacrylate | Sartomer |
| FP 5041 | Bis (4-tert-butyl phenyl) Iodonium Tetraphenylborate | Hampford Research |
| FP 5028 | Bis 4-cumyl Iodonium TetraPhenyl Borate | Hampford Research |
| OPPI FP 5386 | (4-octyloxyphenyl) phenyliodonium hexafluoroantimonate | Hampford Research |
| ES1S | Sulfonium salt cationic photointiaitor with proprietary phosphate-based counterion | SanApro |
| TEGDVE | Triethylene glycol divinylether | BASF |
| CPTX | 1-chloro-4-propoxythioxanthone | Lambson |
| Irgacure 819 (BAPO) | bis(2,4,6-trimethylbenzoyl)-phenylphosphineoxide | BASF |
| Lucirin TPO (TPO) | 2,4,6-trimethylbenzoyl diphenylphosphine oxide | BASF |
| Irgacure 184 (I-184) | alpha hydroxyl cyclohexyl phenyl ketone | BASF |

Test Methodology

To measure polymerization rate (cure speed) of each example, a Real Time Fourier Transform Infrared (FTIR) spectroscopy was used. To increase the data acquisition frequency as well as resolution, a mercury cadmium telluride (MCT) detector was used. Instead of transmission mode, Attenuated Total Reflection (ATR) setup was used. All polymerization rate measurements were performed using the Thermo Scientific Nicolet 8700 model. The Table below shows the experimental conditions setup for the measurement. Under this condition, a total of 41 spectra for 200 seconds were obtained for each measurement:

| | |
|---|---|
| Number of scans | 4 |
| Resolution | 4 |
| Data collection type | Real Time |
| Profile type | Ramp |
| Time sequence | Save 200 seconds |
| Use repeat time (sec) | 5 |

For UV/Vis light control, a Digital Light Lab LED spot lamp (wavelength 385 nm, intensity 5 mW) and controller (AccuCure Photo Rheometer) were used. Calibrated continuous mode was selected. Light intensity and duration (light exposure time) were selected before measurement.

For measurement, a couple of drops of selected sample are placed in the center of ATR crystal setup. Then, an approximately 3 mil film (±0.4 mils) was coated on the top of an ATR crystal using a 3 mil (±0.4 mils) draw down bird bar. Immediately after application of the 3 mil coating, the LED lamp was held on the top of ATR setup and positioned the hole at the center of the hold. Then the real time FTIR scan was initiated. Once 1 spectrum was obtained, the light source was turned on to start polymerization. Based on program input above, each spectrum was obtained every 5 seconds for a total of 200 seconds. A total of 41 spectra were obtained for each experiment.

Polymerization conversion versus time was calculated based on the specific IR peak change representing each functional group. An example of an IR peak change is shown in the picture above. To calculate the conversion for each relevant functional group, the peak height or peak area was calculated as appropriate according to the table below:

| Functional group | Method | Height or area (cm−1) | Baseline (cm−1) |
|---|---|---|---|
| Cycloaliphatic epoxy | Height | 787.791 | 856.253-778.149 |
| Oxetane | Area | 998.962-943.999 | 998.962-943.999 |
| Acrylate | Area | 1419.374-1396.232 | 1419.374-1396.232 |

With the raw data obtained, it was important to remove the first one to two data points since the experimental cure speed procedure has an unknown short time lag between turning on the FTIR detecting equipment and the light source used to cure the sample. To account for any uncertainty associated with the amount of statistical noise generated by these preliminary data points, three sets of curve fits were generated for each data set. In each case, the model equation against which the data set was to be fit is Conv=a(1−e(−b*(time−c))). For this, Microsoft Excel version 14.0.7116.5000 (32 bit) with the data analysis add on was used to fit the raw data.

In the first case, the entire data set (including the first two data points) was fit. In the second case, the entire data set minus the first data point was fit. In the third case, the entire data set minus the first and second data points was fit. In each case a curve fit coefficient $r^2$ was created. The data set that has the first data point above 1% conversion and its curve fit combination yields an $r^2$ above 0.90 was selected for use and the resulting curve fit equation results were used for further calculation of cure speed at 95% of plateau conversion. In the event that the curve fit coefficient $r^2$ was below 0.90, the data was rerun again.

As discussed above, the data was fit to the equation form Conv=a(1−e(−b*(time−c))), where "Conv" is the conversion % as measured by FTIR peak ratios, and time being the time of light exposure duration, "a" being the plateau conversion, "b" being the resulting derived cure speed coefficient which was used to calculate the cure speed, and "c" being the resulting derived cure induction time. Once the data was fit, the software generated the experimentally derived equation with the numerical parameters for "a," "b," and "c" being determined from the experimental data and the fit. For cationically curable materials (i.e. epoxies and oxetanes), "c" has no meaning since there is no cure induction time. Therefore in such cases, "c" was disregarded. The variable "a" was used as the plateau conversion under the cure conditions used and represents the total asymptotic extent to which the component was converted. The variable "b" was used to calculate the time to 95% plateau conversion ($T_{95}$) of "a" through the equation $T_{95}=\ln(0.05/b)$. Reported in Table 3 below is the calculated conversion of three different polymerizable components (epoxy, oxetane, and acrylate) at 100 seconds.

Examples 1-13

First, a base resin for additive fabrication was prepared according to well-known methods in the art by combining an oxetane component, a cycloaliphatic epoxide component, a polyol component, a glycidyl ether epoxide component, and an acrylate component. The details of the so-called "control package" are provided in Table 2 below. The entire composition of formulations 1-13, along with conversion test results using a 5 mW, 385 nm UV/vis light source, is provided in Table 3.

TABLE 2

Control Package. Values are listed in parts by weight

| Component\Formula | Resin Base 1 |
|---|---|
| Celloxide 2021P | 54.0 |
| OXT-101 | 9.0 |
| PolyTHF-1000 (Polytetramethylene glycol MW1000) | 18.0 |
| CN 110 (Bisphenol A Diglycidyl Diacrylate) | 18.0 |
| Total (parts per weight) | 99.0 |

Discussion of Results

The data in Table 3 illustrates that various embodiments according to the present invention are suitable for facilitating hybrid cure under UV/vis exposure conditions. Notably, when comparing formulation 1 to formulations 10-12, the addition of a Norrish Type I or Type II photoinitiator did not noticeably approve cure performance. In fact, the presence of a phosphine-containing photoinitiator (BAPO and TPO; see examples 10-11) actually degraded cure performance.

Additional Exemplary Embodiments

A first additional exemplary embodiment is a radiation curable composition comprising:
a. A first photoacid generator having an iodonium salt cation and a borate-containing anion that is devoid of a fluorine atom; preferably wherein the cation has one of the following structures:

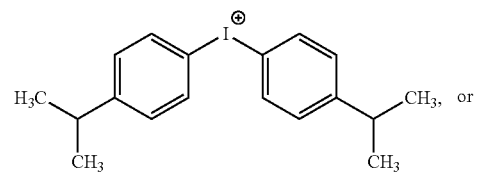

(Bis 4-cumyl iodonium tetraphenyl borate; CAS 1158840-74-4

(Bis (4-tert-butyl phenyl) iodonium tetraphenylborate CAS 131725-16-1 and preferably wherein the cation possesses the following structure:

TABLE 3

Values are listed in parts by weight unless otherwise denoted

| | Formulation | | | | | | | | | | | | |
|---|---|---|---|---|---|---|---|---|---|---|---|---|---|
| Component | 1 | 2 | 3 | 4 | 5 | 6 | 7 | 8 | 9 | 10 | 11 | 12 | 13 |
| FP 5041 | 0.5 | | 2 | 0.5 | 0.5 | 0.5 | 0.5 | 0.5 | 0.5 | 0.5 | 0.5 | 0.5 | 0.5 |
| FP 5028 | | 0.5 | | | | | | | | | | | |
| OPPI FP 5386 | 2 | 2 | | 2 | | 2 | 2 | 2 | 2 | 2 | 2 | 2 | |
| ES1S | | | | | 1 | | | | | | | | 2 |
| TEGDVE | 3 | 3 | 3 | | 3 | 3 | 3 | 3 | 3 | 3 | 3 | 3 | 3 |
| CPTX | 0.15 | 0.15 | 0.15 | 0.15 | 0.15 | 0.15 | | 0.15 | 0.15 | 0.15 | 0.15 | 0.15 | 0.15 |
| BAPO | | | | | | | | 0.2 | | 2 | | | |
| TPO | | | | | | | | | 0.2 | | 2 | | |
| I-184 | | | | 4 | | | | | | | | 2 | |
| Control package | 99 | 99 | 99 | 99 | 99 | 99 | 99 | 99 | 99 | 92.35 | 92.35 | 92.35 | 94.35 |
| Epoxy conversion % at 100 sec | 39.5 | 47.5 | 5.1 | 30.8 | 21.8 | 34.3 | 3.2 | 43.4 | 41.5 | 37.3 | 33.3 | 43.1 | 8.7 |
| Oxetane conversion % at 100 sec | 46.8 | 59.7 | 9.8 | 34.6 | 26.7 | 43.3 | 1.1 | 49.7 | 49.4 | 37.3 | 40.4 | 47.1 | 13.7 |
| Acrylate conversion % at 100 sec | 94.7 | 94.2 | 100.0 | 92.3 | 93.5 | 90.1 | 0.7 | 94.8 | 95.0 | 88.7 | 98.1 | 100.0 | 99.6 |
| Average of all 3 | 60.3 | 67.1 | 38.3 | 52.6 | 47.3 | 55.9 | 1.7 | 62.6 | 62.0 | 54.4 | 57.3 | 63.4 | 40.7 |

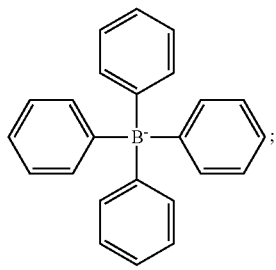 [SMILES: c1ccc([B-](c2ccccc2)(c2ccccc2)c2ccccc2)cc1]

b. a second photoacid generator, preferably an iodonium salt;
c. electron-donating substituent attached to vinyl group; such as a vinyl ether;
d. optionally, a photosensitizer;
e. a polymerizable component; and
f. optionally, an additive component comprising one or more stabilizers;

wherein the composition is preferably substantially devoid of a free-radical photoinitiator possessing a phosphorous atom; or is substantially devoid of a Norrish Type I photoinitiator; or is substantially devoid of a Norrish Type II photoinitiator.

A first aspect of a second additional exemplary embodiment is a radiation curable composition comprising a free-radically polymerizable component, a cationically polymerizable component, a free-radical photoinitiator component, and a cationic photoinitiator component; wherein the free-radical photoinitiator component is substantially devoid of, or contains less than 0.1 wt. %, or less than 0.05 wt. %, or less than 0.01 wt. % of a Norrish Type I photoinitiator.

Another aspect of the second additional exemplary embodiment is a radiation curable composition according to the first aspect of the second additional exemplary embodiment, wherein the free-radical photoinitiator component is substantially devoid of, or contains less than 0.1 wt. %, or less than 0.05 wt. %, or less than 0.01 wt. % of a Norrish Type II photoinitiator.

Another aspect of the second additional exemplary embodiment is a radiation curable composition according to any of the previous aspects of the second additional exemplary embodiment, wherein the composition is substantially devoid of, or contains less than 0.1 wt. %, or less than 0.05 wt. %, or less than 0.01 wt. % of a Norrish Type I photoinitiator.

Another aspect of the second additional exemplary embodiment is a radiation curable composition according to any of the previous aspects of the second additional exemplary embodiment, wherein the free-radical photoinitiator component comprises, consists essentially of, or consists of one or more iodonium salt-based photoinitiators.

Another aspect of the second additional exemplary embodiment is a radiation curable composition according to the previous aspect of the second additional exemplary embodiment, wherein the iodonium salt-based photoinitiator(s) comprise a borate-containing anion.

Another aspect of the second additional exemplary embodiment is a radiation curable composition according to either of the previous two aspects of the second additional exemplary embodiment, wherein iodonium salt-based photoinitiator(s) comprise a tetraphenyl borate anion.

Another aspect of the second additional exemplary embodiment is a radiation curable composition according to any of the previous aspects of the second additional exemplary embodiment, wherein the cationic photoinitiator component comprises, consists of, or consists essentially of one or more iodonium salt-based cationic photoinitiators.

Another aspect of the second additional exemplary embodiment is a radiation curable composition according to any of the previous aspects of the second additional exemplary embodiment, wherein the free-radically polymerizable component comprises, consists of, or consists essentially of one or more (meth)acrylate-functional compounds.

Another aspect of the second additional exemplary embodiment is a radiation curable composition according to any of the previous aspects of the second additional exemplary embodiment, wherein the cationically polymerizable component comprises, consists of, or consists essentially of one or more epoxy- and/or oxetane-functional compounds.

Another aspect of the second additional exemplary embodiment is a radiation curable composition according to any of the previous aspects of the second additional exemplary embodiment, wherein the cationically polymerizable component comprises, consists of, or consists essentially of one or more cycloaliphatic epoxides, glycidyl ether epoxides, and/or oxetanes.

Another aspect of the second additional exemplary embodiment is a radiation curable composition according to any of the previous aspects of the second additional exemplary embodiment, further comprising a photosensitizer.

Another aspect of the second additional exemplary embodiment is a radiation curable composition according to any of the previous aspects of the second additional exemplary embodiment, further comprising a multifunctional vinyl ether compound.

Another aspect of the second additional exemplary embodiment is a radiation curable composition according to the previous aspect of the second additional exemplary embodiment, wherein the multifunctional vinyl ether compound possesses at least two vinyl groups.

Another aspect of the second additional exemplary embodiment is a radiation curable composition according to any of the previous aspects of the second additional exemplary embodiment, further comprising one or more additives.

Another aspect of the second additional exemplary embodiment is a radiation curable composition according to any of the previous aspects of the second additional exemplary embodiment, wherein, relative to the weight of the entire composition:

the free-radically polymerizable component is present from 5 wt. % to 50 wt. %;
the cationically polymerizable component is present from 20 wt. % to 90 wt. %;
the free-radical photoinitiator component is present from 0.025 wt. % to 5 wt. %;
the cationic photoinitiator component is present from 0.5 to 8 wt. %;
and the additives are present from 0 to 40 wt. %;
wherein the weight of all components equals 100%.

Unless otherwise specified, the term wt. % means the amount by mass of a particular constituent relative to the entire liquid radiation curable composition for additive fabrication into which it is incorporated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While the invention has been described in detail and with reference to specific embodiments thereof, it will be apparent to one of ordinary skill in the art that various changes and modifications can be made therein without departing from the spirit and scope of the claimed invention.

What is claimed is:

1. A radiation curable composition comprising a cationically curable constituent and a free-radically curable constituent, said composition further comprising at least a first photoinitiator that is an iodonium salt of a non-fluorinated borate anion, and a photosensitizer.

2. The radiation curable composition of claim 1, wherein the iodonium salt of the non-fluorinated borate anion is an iodonium salt of a non-halogenated borate anion.

3. The radiation curable composition of claim 1, wherein the non-fluorinated borate anion of the iodonium salt has the formula:

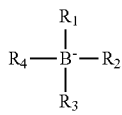

wherein $R_1$-$R_4$ are independently selected from the group consisting of alkyl, alkenyl, alkynyl, cycloalkyl, heterocycloalkyl, aryl, and heteroaryl, and further wherein (i) one or more substitutable carbon atoms of alkyl, alkenyl, or alkynyl is optionally substituted with hydroxy, carboxy, alkoxy, alkanoyl, hydroxyalkyl, carboxyalkyl, alkoxyalkyl, or alkanoylalkyl, or (ii) one or more substitutable carbon atoms of cycloalkyl, heterocycloalkyl, aryl, or heteroaryl is optionally substituted with alkyl, hydroxy, carboxy, alkoxy, alkanoyl, hydroxyalkyl, carboxyalkyl, alkoxyalkyl, or alkanoylalkyl.

4. The radiation curable composition of claim 3, wherein $R_1$-$R_4$ are independently selected from an aryl radical, optionally substituted at one or more substitutable carbon atoms with alkyl or alkoxy.

5. The radiation curable composition of claim 4, wherein $R_1$-$R_4$ are each phenyl, optionally independently substituted with alkyl or alkoxy, wherein alkyl or the alkyl portion of alkoxy has from 1-10 carbon atoms.

6. The radiation curable composition of claim 5, wherein the non-fluorinated borate anion of the iodonium salt is a tetraphenyl borate anion having the formula:

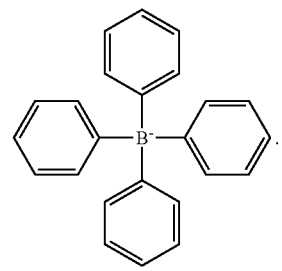 [SMILES: c1ccc([B-](c2ccccc2)(c2ccccc2)c2ccccc2)cc1]

7. The radiation curable composition of claim 1, wherein the iodonium salt of the non-fluorinated borate anion has a diaryliodonium cation.

8. The radiation curable composition of claim 7, wherein the diaryliodonium cation of the iodonium salt is a diphenyliodonium salt, having two phenyl radicals optionally substituted with alkyl or alkoxy, wherein alkyl or the alkyl portion of alkoxy has from 1-10 carbon atoms.

9. The radiation curable composition of claim 8, wherein the diphenyliodonium cation of the iodonium salt is a bis 4-cumyl iodonium cation or a bis 4-tert-butyl iodonium cation having the structure:

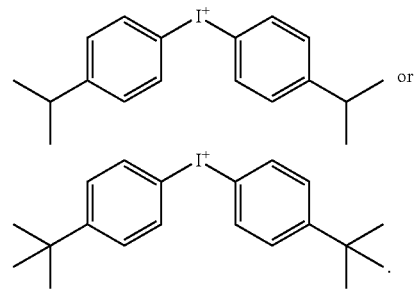

10. The radiation curable composition of claim 1, wherein the first photoinitiator is bis 4-cumyl iodonium tetraphenyl borate or bis 4-tert-butyl iodonium tetraphenyl borate.

11. The radiation curable composition of claim 1, wherein the composition is substantially devoid of a free-radical phosphorous-containing photoinitiator, or contains an amount by weight of a free-radical phosphorous-containing photoinitiator of less than about 0.1 wt-%.

12. The radiation curable composition of claim 1, wherein the composition is substantially devoid of a Norrish Type I and/or Norrish Type II photoinitiator, or contains an amount by weight of a Norrish Type I and/or Norrish Type II photoinitiator of less than about 0.1 wt-%.

13. The radiation curable composition of claim 1, wherein the cationically curable constituent comprises both a cycloaliphatic epoxy compound and an oxetane compound.

14. The radiation curable composition of claim 13, wherein when the composition is exposed to UV/vis optics emitting radiation with a peak spectral output from 375-405 nm and an irradiance at a surface of the composition of 2 mW/cm$^2$ for 10 seconds, the cycloaliphatic epoxy compound achieves a conversion of at least about 35%, and the oxetane compound achieves a conversion of at least about 40%.

15. The radiation curable composition of claim 1, wherein the first photoinitiator is present in the composition in an amount from about 0.1 wt-% to about 1 wt-%.

16. The radiation curable composition of claim 1, further comprising a second iodonium salt cationic photoinitiator, wherein the second iodonium salt cationic photoinitiator is present in the composition in an amount from about 0.5 wt-% to about 8 wt-%.

17. The radiation curable composition of claim 1, further comprising a reductant, wherein said reductant possesses an electron-donating substituent bonded to a vinyl group.

18. The radiation curable composition of claim 17, wherein the reductant comprises a vinyl ether compound, optionally wherein the vinyl ether compound possesses at least two vinyl groups.

19. The radiation curable composition of claim 1, wherein the photosensitizer is present in the composition in an amount by weight from about 0.05 to about 0.8 wt %.

20. The radiation curable composition of claim 17, wherein the reductant is present in the composition in an amount by weight from about 1 wt % to about 10 wt %.

\* \* \* \* \*